(12) United States Patent
Durham et al.

(10) Patent No.: US 11,520,906 B2
(45) Date of Patent: Dec. 6, 2022

(54) CRYPTOGRAPHIC MEMORY OWNERSHIP TABLE FOR SECURE PUBLIC CLOUD

(71) Applicant: Intel Corporation, Santa Clara, CA (US)

(72) Inventors: David M. Durham, Beaverton, OR (US); Siddhartha Chhabra, Portland, OR (US); Ravi L. Sahita, Portland, OR (US); Barry E. Huntley, Hillsboro, OR (US); Gilbert Neiger, Portland, OR (US); Gideon Gerzon, Zichron Yaakov (IL); Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 16/830,379

(22) Filed: Mar. 26, 2020

(65) Prior Publication Data
US 2020/0293668 A1    Sep. 17, 2020

Related U.S. Application Data

(62) Division of application No. 15/808,986, filed on Nov. 10, 2017, now Pat. No. 10,671,737.

(51) Int. Cl.
*G06F 21/60* (2013.01)
*G06F 3/06* (2006.01)
(Continued)

(52) U.S. Cl.
CPC ............ *G06F 21/602* (2013.01); *G06F 3/067* (2013.01); *G06F 3/0623* (2013.01);
(Continued)

(58) Field of Classification Search
CPC .... G06F 21/602; G06F 3/0623; G06F 3/0661; G06F 3/067; G06F 12/1009; G06F 21/53;
(Continued)

(56) References Cited

U.S. PATENT DOCUMENTS 8,819,455 B2   8/2014 Chhabra et al.
9,213,653 B2   12/2015 Durham et al.
(Continued)

OTHER PUBLICATIONS

Advanced Micro Devices, "Secure Encrypted Virtualization Key Management", Aug. 2016, 68 pages.
(Continued)

*Primary Examiner* — Mohammad W Reza
(74) *Attorney, Agent, or Firm* — Trop, Pruner & Hu, P.C.

(57) ABSTRACT

A computer-readable medium comprises instructions that, when executed, cause a processor to execute an untrusted workload manager to manage execution of at least one guest workload. The instructions, when executed, also cause the processor to (i) receive a request from a guest workload managed by the untrusted workload manager to access a memory using a requested guest address; (ii) obtain, from the untrusted workload manager, a translated workload manager-provided hardware physical address to correspond to the requested guest address; (iii) determine whether a stored mapping exists for the translated workload manager-provided hardware physical address; (iv) in response to finding the stored mapping, determine whether a stored expected guest address from the stored mapping matches the requested guest address; and (v) if the stored expected guest address from the stored mapping matches the requested guest address, enable the guest workload to access contents of the translated workload-manager provided hardware physical address.

21 Claims, 11 Drawing Sheets

(51) Int. Cl.
*G06F 12/1009* (2016.01)
*G06F 21/57* (2013.01)
*G06F 21/53* (2013.01)

(52) U.S. Cl.
CPC ........ *G06F 3/0661* (2013.01); *G06F 12/1009* (2013.01); *G06F 21/53* (2013.01); *G06F 21/57* (2013.01); *G06F 2212/1052* (2013.01)

(58) Field of Classification Search
CPC . G06F 21/57; G06F 2212/1052; G06F 12/109
See application file for complete search history.

(56) References Cited

U.S. PATENT DOCUMENTS

| | | | |
|---|---|---|---|
| 9,335,943 B2 | 5/2016 | Sahita et al. | |
| 2008/0065854 A1* | 3/2008 | Schoenberg | G06F 12/109 |
| | | | 710/22 |
| 2010/0281273 A1 | 11/2010 | Lee et al. | |
| 2012/0072906 A1* | 3/2012 | Tsirkin | G06F 12/1081 |
| | | | 718/1 |
| 2014/0372740 A1 | 12/2014 | Semenko et al. | |
| 2015/0121366 A1 | 4/2015 | Neiger et al. | |
| 2016/0350244 A1 | 12/2016 | Tsirkin et al. | |
| 2017/0116419 A1 | 4/2017 | Woodward et al. | |
| 2017/0242811 A1* | 8/2017 | Tsirkin | G06F 12/0653 |
| 2018/0136868 A1* | 5/2018 | Tsirkin | G06F 9/45558 |

OTHER PUBLICATIONS

Advanced Micro Devices, "Secure Encrypted Virtualization Key Management", Jan. 2017, 92 pages.
Advanced Micro Devices, "AMD64 Architecture Programmer's Manual", AMD64 Technology, Dec. 2016, vol. 2: System Programming, cover page; pp. 207-210; pp. 531-544.

* cited by examiner

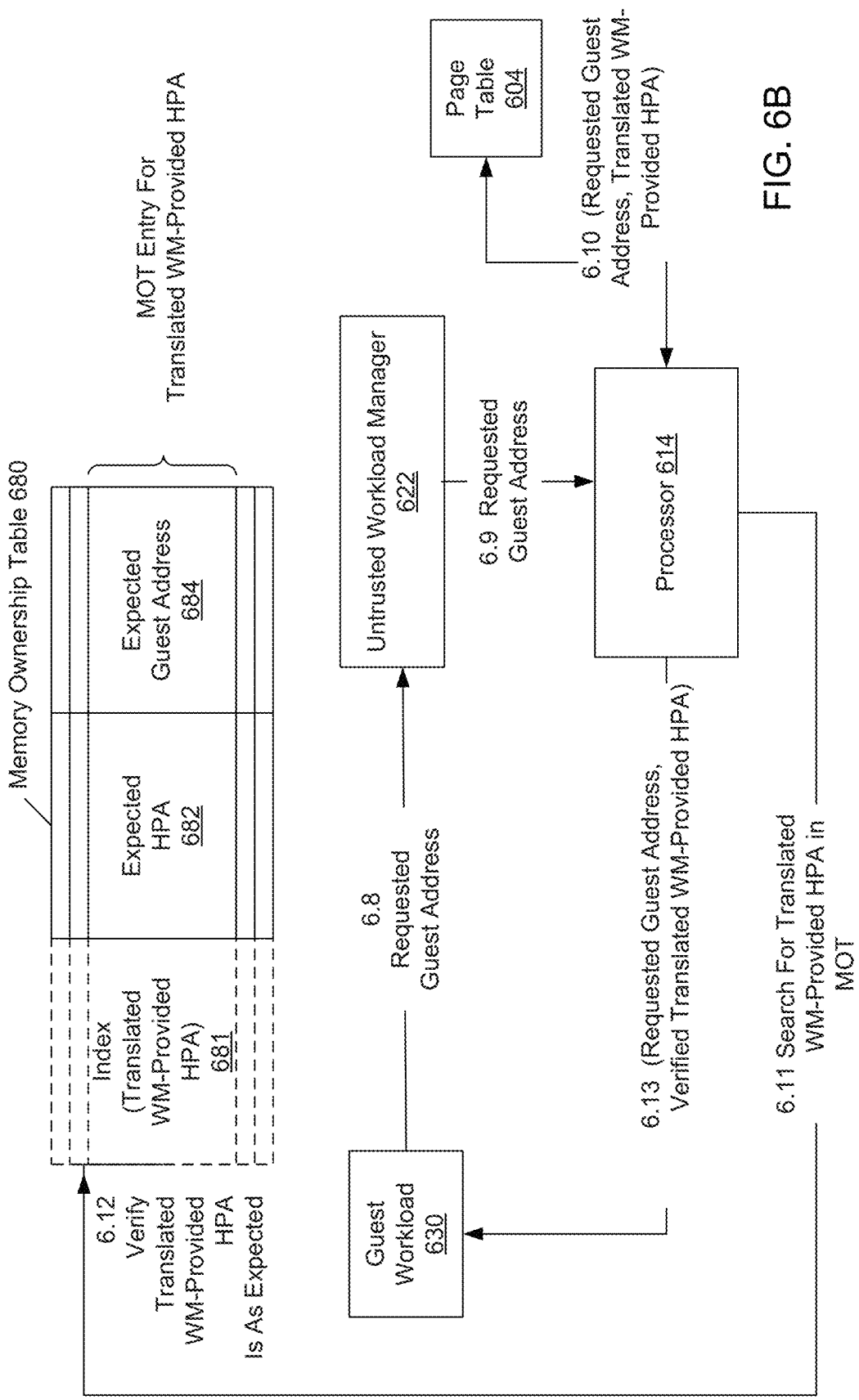

| Index (Translated/WM-Provided HPA) | Expected HPA | Expected Guest Address | State | Zero | Key |
|---|---|---|---|---|---|
| 0 | 0 | 8 | Large | 0000 | K1 |
| 1 | 1 | 9 | Active | 0000 | K2 |
| 2 | 2 | 10 | Active | 0000 | K1 |
| 3 | 3 | 11 | Share | 0000 | K2 |
| 4 | 4 | 12 | Active | 0000 | K1 |
| 5 | 5 | 13 | Active | 0000 | K2 |
| 6 | 6 | 14 | Active | 0000 | K1 |
| 7 | 7 | 15 | Inval | 0000 | K2 |

FIG. 10

CRYPTOGRAPHIC MEMORY OWNERSHIP TABLE FOR SECURE PUBLIC CLOUD

This is a divisional application of U.S. patent application Ser. No. 15/808,986, filed Nov. 10, 2017, the content of which is hereby incorporated by reference.

TECHNICAL FIELD

This application pertains to cryptographic memory ownership tables for a secure public cloud.

BACKGROUND

In cloud services environments today, the cloud service provider's host workload management software (such as a Virtual Machine Monitor (VMM) in a virtualization environment) has full control over the guest workloads (such as guest Virtual Machines) that the host workload management software manages on behalf of a consumer of cloud services. The host workload management software can read or write to guest memory, modify the control flow of software executing the guest workload, read or modify guest register state, read or modify guest control structures, such as register values, and so on. This complete control of the execution of a guest workload poses a security risk that the host workload management software is compromised and may modify the guest workload such that consumer's secrets and data residing within the guest workload are exposed.

BRIEF DESCRIPTION OF THE DRAWINGS

FIGS. 6A and 6B are diagrams showing data flows between components of a server environment in accordance with embodiments.

FIG. 10 is a diagram showing a memory ownership table in accordance with embodiments.

DETAILED DESCRIPTION

Figure 1:
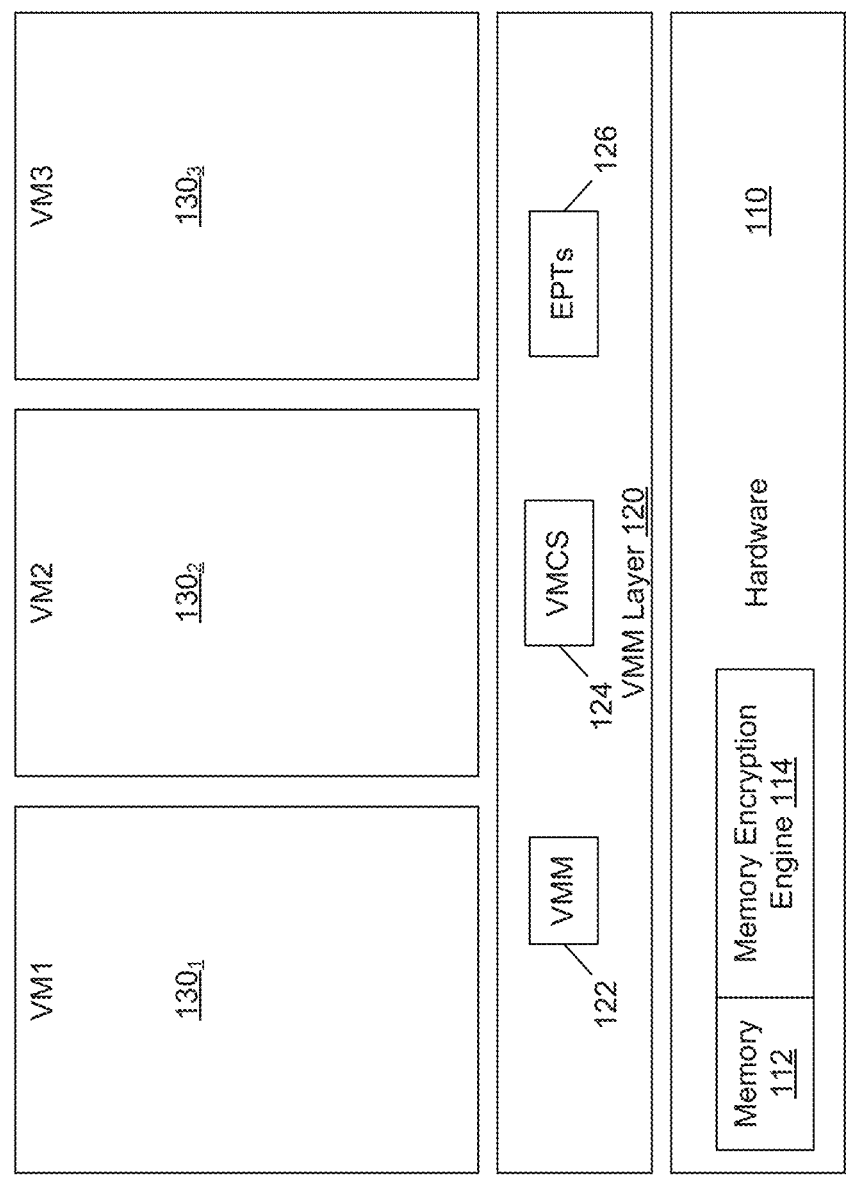
FIG. 1 is a block diagram showing a typical virtual machine environment.

In a virtualized cloud environment, a Virtual Machine Monitor (VMM) serves as the host workload management software, and guest workloads are referred to as "virtual machines." The techniques provided herein are described in terms of a VMM and a guest VM, although the techniques apply generally to other types of host workload management software, such as operating systems, and other types of guest workloads, such as applications.

To make the best use of resources, host workload management software running in the cloud may switch execution from a guest workload owned by one consumer (sometimes referred to as an owner of the guest workload or a tenant of the cloud services provider's server environment) to another guest workload owned by another consumer. With a switch from one guest workload to another, data structures that pertain to the execution state of the guest workload may be modified by the host workload management software. These data structures may include memory mappings (e.g., Page Tables and Extended Page Tables (EPTs)) and control structures (such as Virtual Machine Control Structures) that are used to control execution of the guest workload.

A page table is the data structure used by a memory system in a computer operating system to store the mapping between virtual/linear addresses and physical addresses. Virtual/linear addresses are used by the accessing process, while physical addresses are used by the hardware. Every process is given the impression that large, contiguous sections of memory are being used to execute the process's workload; however, physically, the memory of each process may be dispersed across different areas of physical memory, or may have been moved (paged out) to another storage device, typically to a hard disk drive. When a process requests access to data in memory, the operating system maps the virtual/linear address provided by the process to the physical address of the actual memory location where that data is stored However, in a virtualization environment, the operating system for a guest VM does not have access to the physical hardware addresses. Therefore, a guest VM forms its own memory mappings between guest virtual/linear addresses (VAs) and guest physical memory addresses (GPAs) using the guest operating system's own page tables. These memory mappings may also use Intel®'s Extended Page Table (EPT) technology, in which a translation lookaside buffer (TLB) cache keeps track of virtual memory and physical memory as seen to the guest operating system. The purpose of the EPT is to make each guest virtual machine think that the guest VM itself is managing the memory hardware when accessing a guest physical address. However, the guest physical address is actually being managed and translated by the VMM into the actual hardware physical address. In this way, the VMM gives the illusion to VM software that the VM software is managing a physical system, when in reality the physical system is being managed by another layer of software, the VMM.

Individual VMs are tracked by the TLB by assigning an address space identifier (ASID) to each VM. Using the address space identifier, the TLB can track virtual machine address space mapping to physical hardware addresses for each virtual machine. The ASID is used to tag TLBs so that guest VM state need not be flushed from the TLBs for the previous VM when switching to another VM. Instead, the TLB uses the tag to keep the different VM entries separate, using only the tags for the currently running VM while still caching state for the non-active VMs.

In virtualization environments, the Virtual Machine Control Structure (VMCS) is a data structure in memory that heretofore has been managed by the host VMM. The VMCS holds the processor register states of both the guest VM and the host VMM. The VMCS exists once for each logical processor for each guest VM, while the guest VM is managed by the host VMM. In a multi-processor system, each processor simultaneously executing the guest VM may have a unique VMCS. With every change of the execution context between different VMs, the corresponding VMCS is restored for the currently-executing VM, defining the state of the VM's virtual processor. When the execution context switches (VMExits) from a guest VM back to the host VMM, the same VMCS structure is used to restore the host's saved processor state from the host state area of the VMCS.

The disclosure presented herein allows the host VMM to remain in control of memory mappings/page tables, such that the cloud services provider supplying the host VMM controls use of the cloud services provider's resources. In contrast, management of Virtual Machine Control Structures (VMCSs) is moved to the guest VM. While the host VMM may still measure and verify the guest-generated or guest-modified VMCS, the host VMM may request the guest VM to modify the VMCS as the host may require before the VMCS is used.

In this disclosure, the concepts of protecting a consumer's workload and secrets from a compromised cloud services provider's hardware or software and protecting the cloud service provider's hardware and software from a compromised consumer workload are further developed. Additional patent applications which include information pertaining to such concepts include U.S. patent application Ser. No. 15/444,771, filed Feb. 28, 2017, entitled "Secure Public Cloud with Protected Guest-Verified Host Control," and U.S. patent application Ser. No. 15/293,967, filed Oct. 14, 2016, entitled "Secure Public Cloud," each of which claims priority to U.S. Provisional Patent Application No. 62/373,627, filed on Aug. 11, 2016, entitled "Secure Public Cloud," each disclosure of which is hereby incorporated by reference.

In the above-referenced patent applications, protection of a consumer's workload and secrets from a compromised cloud services provider's hardware or software and protection of the cloud service provider's hardware and software from a compromised consumer workload are based on the concept of a key domain. A key domain is a cryptographically separate portion of memory, where access to data stored in memory locations belonging to the key domain requires using an associated key domain key to decrypt the data. When the hardware writes data to a memory location belonging to a key domain, the data are encrypted using the key domain key; when the hardware reads data from a memory location belonging to the key domain, the data are decrypted using the key domain key. If contents of the physical memory locations belonging to a key domain are decrypted using the wrong key domain key, the resulting plaintext may be corrupted and/or an integrity violation may be reported. In response to an integrity violation, the incorrectly used key domain key may be invalidated.

Using key domains, guest VMs execute within a protected region of memory that even the host VMM cannot access because the key domain is encrypted with a consumer-provided (tenant-provided) key domain key unknown to the host VMM. In another embodiment, the protected region of memory is implemented using range registers, where a designated register blocks the host VMM (and other software) from accessing a guest VM's protected memory region. For purposes of this disclosure, the guest VM's protected memory region will be described with respect to key domains, although the techniques described herein are applicable to protected memory regions implemented using other techniques to make the consumer's guest VM inaccessible to the host VMM. The guest VMs can also ensure that the VMM-controlled memory mappings will not compromise the guest VM.

In accordance with the present disclosure, virtualization data structures that pertain to the execution state of the guest VM (e.g., the VMCS) are also located in the protected memory region (key domain). These virtualization data structures are encrypted with the key domain key. The host VMM and other guest VMs, which do not possess the key domain key for other key domains, are unable to modify these control structures and are unable to access the protected memory region. However, methods are provided where the hardware enables the host VMM to verify the contents of these control structures, to assure that the security of the host cannot be compromised by a guest.

A cloud services provider's memory manager, such as a VMM or an OS kernel, may use different key domains to cryptographically separate data belonging to different owners/consumers/tenants. For example, in a cloud services environment, different key domains may be used to cryptographically separate data belonging to different consumers of cloud services, such as banking services. In a virtualization environment, different key domains may be used to separate data belonging to different virtual machines. The data belonging to each of the virtual machines may include, for example, consumer secrets (such as bank account numbers, social security numbers, etc.) belonging to each virtual machine. The data belonging to each of the virtual machines may also include computer code (also referred to as a code image or simply an image) that is to be executed to protect each respective virtual machine's secrets within the cloud services provider's environment.

A consumer owns the key domain in which the consumer's workload is executing. The key domain key is created by the consumer owning the key domain and securely provided directly to the cloud services provider's server hardware, without requiring communication through the cloud services provider's memory manager/VMM/OS kernel. In other embodiments, the consumer may translate a key provided by another entity (such as the cloud services provider's server) into another key that is used to encrypt memory locations belonging to a key domain. In still other embodiments, different keys may be used to encrypt different IP blocks (sets of memory locations) belonging to the key domain; for example, a different key may be used for encrypting an IP block containing code for an consumer VM image from the key used to encrypt other consumer secrets. To simplify the descriptions of embodiments herein, the present application describes the contents of each physical memory location belonging to a key domain as encrypted by a key domain key that is created by the consumer owning the key domain, although other embodiments are within the scope of the invention.

In one embodiment, a key domain is identified using unused physical address bits and the hardware appends an identifier (also referred to herein as a selector) for the identified key domain into the unused address bits (or other metadata passed through a cache). For example, because there will likely be fewer physical memory locations installed in a system than can be addressed using a 64-bit physical memory address, the unused most significant address bits can be used to select between different key domains. Two different key domain addresses can alias to the same physical memory location. However, when data from that physical memory location is read into a cache, the cache holds the key domain addresses independently at the full address resolution (e.g., including the full 64-bit physical memory address). The key domain address uniquely identified when considering the unused physical address bits of the full 64-bit physical memory address determines the key domain to which the physical memory location belongs. By identifying the key domain to which the physical memory location belongs, the key domain key that can be used to decrypt the contents of that physical memory location is also identified. Other embodiments may use a table of keys or key identifiers which are looked up based on a memory address. Other embodiments may encrypt the memory at the processor before the cache. The memory encryption logic may be at any level of the memory hierarchy.

In one embodiment, a Virtual Machine Monitor includes privileged code having the ability to create, exit, and resume execution of VMs. These privileges may include the ability to exit or resume execution of a virtual machine (VMexit/VMresume and VMLaunch).

The consumer's VM image runs as a guest VM, which can only access the memory that is mapped and granted permission by the VMM. The VM uses page tables to store mappings between virtual/linear addresses and guest physical addresses. Second level address translation (also known as nested paging) is performed to translate guest physical addresses (GPA) to host physical addresses (HPA). In the context of address translation, guest virtual/linear addresses may be referred to simply as "virtual addresses," guest physical addresses may be referred to simply as "guest addresses," and host physical addresses may be referred to as "hardware physical addresses." In one embodiment, second level address translation is tracked in Extended Page Tables (EPTs).

In accordance with the present disclosure, while a VMM retains control over EPTs, the encrypted consumer domain image may include an encrypted consumer domain control structure that is specific to the consumer's virtual machine. The Virtual Machine Control Structure (VMCS) that normally would be provided by the host VMM is now also included in the encrypted consumer domain image provided by the consumer, or an intermediary trusted by the consumer, to the cloud services provider.

By providing the control structure that sets the consumer's VM processor state, the consumer retains control of the consumer workload without relying upon the host virtual machine monitor to protect the consumer's workload and data. Furthermore, providing the control structure within the encrypted memory for which the host VMM does not have access and for which the host VMM does not possess the encryption key further protects the consumer's workload and data from a compromised host VMM. Meanwhile, the host VMM may still use hardware mechanisms (such as a Hash Key Domain (HashKD) instruction, which is described in the earlier-referenced patent applications) to evaluate and verify the contents of the VM control structure (and other structures provided by the consumer) before the host VMM instantiates or runs the associated VM.

To enable the host VMM to manage execution of guest VMs without directly modifying the control structures of the guest VMs, another type of guest VM, or software component within a VM, referred to herein as a "guest agent VM," or simply, "agent," may be used. The host VMM launches an agent to operate within the protected key domain in which the guest VM executes. The agent works with the guest VM to protect the guest VM from tampering. In one embodiment, the virtualization environment implements policies that enable the agent to access and modify the control structures that control execution flow and register state of other guest VMs on behalf of the host VMM. By modifying another guest VM's control structures, the agent can perform such functions as loading a consumer-supplied image into the guest VM and creating or modifying additional VMCSs for multiple guest VMs within a protected memory region/key domain. Note that the VMCS functionality provided in traditional virtualization environments by the host VMM is implemented instead by the agent upon request by the host VMM, making the agent an intermediary for the host VMM that operates within the consumer's encrypted key domain. The hardware may allow the host VMM to verify (read but not modify) the contents of the VMCS (and associated structures) before the VM is run to assure that the structures' contents are correct and will not compromise the host VMM.

Furthermore, using the agent as an intermediary between the host VMM and the guest VM allows the agent to validate that the VMM does not misconfigure the guest VM to leak confidential data, inject code or data, or modify the execution flow of the guest VM. The guest VM may use its own memory encryption key (key domain key) to encrypt memory structures. The guest VM then returns the resulting ciphertext to the host VMM for installation into host VMM-specified memory locations on the guest VM's behalf under the host VMM's control. Assuming that the guest VM doesn't already have access to those memory locations, the VMM can install the ciphertext on the VM's behalf.

The agent can also ensure that the VMM-controlled memory mappings/page tables are consistent with the guest VM's own memory mappings. For example, the agent may use a memory ownership table (MOT), also referred to as a reverse mapping table (RMT), that provides mappings from guest addresses (either guest virtual addresses and/or guest physical addresses) to expected hardware physical addresses. These mappings are captured in the MOT by the guest VM so that the guest VM can be assured that the guest VM's encrypted memory has not been subject to remapping attacks by the VMM. Here, the VM may produce ciphertext entries for the MOT (encrypted with the VM's secret memory encryption key/key domain key). The VM may provide these ciphertext entries to the VMM, and the VMM may install these entries into the MOT table (which may be managed as an in-memory data structure).

In one embodiment, prior to instantiation of a particular guest VM, an agent running on behalf of the host VMM initializes a VMCS for the particular guest virtual machine. The host VMM causes the VMCS to be loaded when the particular guest VM is instantiated (e.g., via a VM Pointer Load (VMPTRLD) instruction). In another embodiment, the consumer may remotely create an image (e.g., create the agent VM) using this same methodology. Once the agent is loaded into memory and can be run, then the agent can continue to create and modify VMCSs and other control structures on behalf of the VMM.

The host VMM provides to the consumer at least one hardware physical address of a memory location into which an image for the guest VM is to be loaded. This hardware physical address may be provided to either the consumer when the consumer is creating the initial encrypted memory image, or to the consumer VM's agent prior to instantiation of the guest VM, or to the consumer's guest VM once the consumer's guest VM is instantiated. An initial instruction pointer is set in the guest VM's VMCS to point to the VMM-provided hardware physical address into which the image for the guest VM is to be loaded. Using the host VMM-provided hardware physical address as a starting point, the guest VM determines other expected hardware physical addresses to be accessed by the guest VM during execution. Additional fields in the VMCS may be updated with the values of these expected hardware physical addresses.

In one embodiment, as a guest VM determines expected hardware physical addresses to be accessed during execution, the guest VM establishes mappings from the guest addresses of the guest VM's page table to these expected hardware physical addresses. The guest VM's mappings from the guest addresses of the guest VM's page table to the expected hardware physical addresses are stored in a memory ownership table (MOT). In one embodiment, the guest VM encrypts the its memory ownership table entries with the same key domain key used to encrypt the key domain for the guest VM. By encrypting a guest VM's MOT entries with the guest VM's key domain key, only a possessor of the key domain key can establish valid mappings for that guest VM's encrypted memory in the memory ownership table.

When creating the consumer's initial encrypted consumer image, the remote consumer encrypts the key domain key that the consumer wishes to use with the server's public key such that only the server hardware (or the server hardware's underlying protected processor/microcode/firmware) can decrypt the key domain key and install the key domain key in the memory encryption engine. The Create Key Domain (CreateKD) instruction (described in the earlier-referenced patent applications) is used to pass the consumer's encrypted key domain key to the server hardware. The host VMM may determine the associated key identifier (KeyID) for the key domain. The host VMM has access only to the encrypted key domain key and therefore cannot decrypt the guest VM's protected key domain. The host VMM issues the CreateKD command to a processor, providing the encrypted key domain key and its associated key identifier (KeyID). In response to receiving the CreateKD command, the processor decrypts the encrypted key domain key using a private key associated with the processor. The processor also programs the memory encryption engine to use the decrypted key domain key for each memory address containing the key domain identifier.

When the processor hardware processes a memory read or write command for a currently executing guest VM, the processor hardware (e.g., a page miss handler (PMH)) looks up the virtual/linear address provided by the currently executing guest VM in the operating system page tables to obtain the guest physical address. The processor uses the VM's key domain key when accessing the VM's page tables to determine the guest physical address for the virtual/linear address to be accessed by the read or write command. The processor will then use the VMM's key domain key (by setting the VMM's KeyID in the address or otherwise indicating no key) to obtain the host physical address (HPA or hardware physical address) for the guest physical address (GPA) from the extended page tables managed by the VMM. If the guest physical address (GPA) is not found in the cached mappings, a page miss handler (PMH) loads the extended page tables (EPTs) from unencrypted memory (or otherwise using the VMM's KeyID). The PMH performs a page walk of the EPTs to find a mapping from the guest virtual/linear address to a hardware physical address.

In one embodiment, the PMH EPT walk ends by verifying that the found hardware physical address corresponding to a given guest physical address matches the guest VM's expected hardware physical address. This verification is performed using a memory ownership table (MOT). The processor hardware uses the currently executing guest VM's memory encryption key (key domain key) to decrypt the memory ownership table entry to determine the expected hardware physical address.

The memory ownership table, as a table, may be indexed by the physical address of the page being accessed. The MOT can be checked for any non-cached (not already in TLB) memory access, including accesses of direct physical addresses that bypass paging. Accesses of direct physical addresses that bypass paging include accessing the addresses in the VMCS and accessing the address used to load a VMCS, as performed by the VM Pointer Load (VMPTRLD) instruction. This verification is performed with a lookup of the found hardware physical address in entries in the memory ownership table that corresponds to the currently executing guest VM. In one embodiment, the processor hardware determines the currently executing guest VM's key domain identifier (KD_ID) from the uppermost bits in the hardware physical address that is provided when loading a VMCS (such as the physical address used with the VMPTRLD instruction). The MOT may also indicate if the physical address provided in the VMPTRLD instruction is a VMCS as far as the guest VM is concerned (since only the consumer, guest or its agent create a VMCS encrypted with the key domain key).

If the memory ownership table entry decrypts properly and is not corrupt, the found hardware physical address of the EPT entry is compared to the expected hardware physical address stored in the memory ownership table for the guest physical address. If the EPT's hardware physical address matches the guest VM's expected hardware physical address, the processor hardware may proceed with the memory read or write. In one embodiment, the mapping from the virtual/linear address to the hardware physical address is saved in a translation lookaside buffer and/or cache.

If the EPT's hardware physical address does not match the guest VM's expected hardware physical address, the guest VM may be forced to exit or the processor may abort the memory read or write attempt.

These techniques protect the consumer's workload from access or manipulation by the host VMM yet enable the host VMM to retain full control of the platform and manage guest virtual machines running on the platform. Memory encryption technology protects guest VM workloads from physical attacks and prevents the host VMM from accessing the VM's (encrypted) memory. Neither the cloud service provider's software, administrators, nor anyone with physical access to the cloud service provider's servers can access or modify protected guest VMs. The protection provided using the techniques described herein effectively provides the same level of confidentiality and security as the consumer would have running the same workload in a private cloud (on premise).

Referring now to FIG. 1, a block diagram showing components of a typical virtual machine environment 100 is shown. A typical implementation of a virtual machine environment provided in a server of a cloud services provider is shown. Server hardware 110 includes a memory 112 and a memory encryption engine 114.

Running on the server hardware 110 is a Virtual Machine Monitor (VMM) layer 120. In the typical virtual machine environment 100 shown, the VMM layer 120 is computer software or firmware that creates and runs virtual machines (VMs), such as VM1 130$_1$, VM2 130$_2$, and VM3 130$_3$, on the cloud services provider's server hardware 110. Each of VMs VM1 130$_1$, VM2 130$_2$, and VM3 130$_3$ is shown as standalone block in FIG. 1, representing different VMs all under the control of a common VMM layer 120. The VMM layer 120 provides access to server resources, such as server hardware 110, to the VMs that the VMM controls.

The VMM layer 120 uses data structures such as a VM control structure (VMCS) 124 and extended page tables (EPTs) 126 to control execution of VMs. The VMCS is a data structure in memory that exists once for each VM, while it is managed by the VMM. With every change of the execution context between different VMs, the VMCS is restored for the current VM, defining the state of the VM's virtual processor. Extended page tables (EPTs) are used to remap the memory of a VM's virtual processor from guest physical addresses used by the guest to the physical addresses managed by the host, allowing the host to assign which memory resources/locations are available to a guest.

The VMM layer's 120 software or firmware is provided by the cloud services provider and is part of the Trusted Computing Base (TCB) for each VM. Modern operating systems strive to reduce the size of the TCB so that an exhaustive examination of the TCB code base (by means of manual or computer-assisted software audit or program verification) becomes feasible.

In the normal virtual machine environment 100 of FIG. 1, the VMM 122 provided by the cloud services provider is in the TCB of each of VMs VM1 $130_1$, VM2 $130_2$ and VM3 $130_3$. The inclusion of the VMM 122 in the TCB forecloses a particular VM such as VM1 $130_1$ from seeing, measuring, or trusting the VMM 122 that controls that particular VM. The cloud services provider can change the VMM 122 at any time without the VM VM1 $130_1$ owner's knowledge. Furthermore, no cryptographic separation exists between VMs. If the VMM has been compromised, a corrupt VM can access private data in a second VM via the compromised VMM that nevertheless is trusted by the second VM.

For a consumer to receive assurance that the VMM controlling the consumer's processes/VMs is trustworthy, most known techniques use hardware to measure the software/firmware running on the remote machine in the cloud (in this case, the VMM 122) and attest back to the consumer that the software/firmware that is running on the remote machine in the cloud is a version of the software/firmware that the consumer expects. With the public cloud services provider's VMM being included in the consumer's TCB, the consumer has no way to independently assess an attestation of trustworthiness made by the public cloud services provider nor can the consumer know that the VMM remains uncompromised after a measurement is taken.

Figure 2:
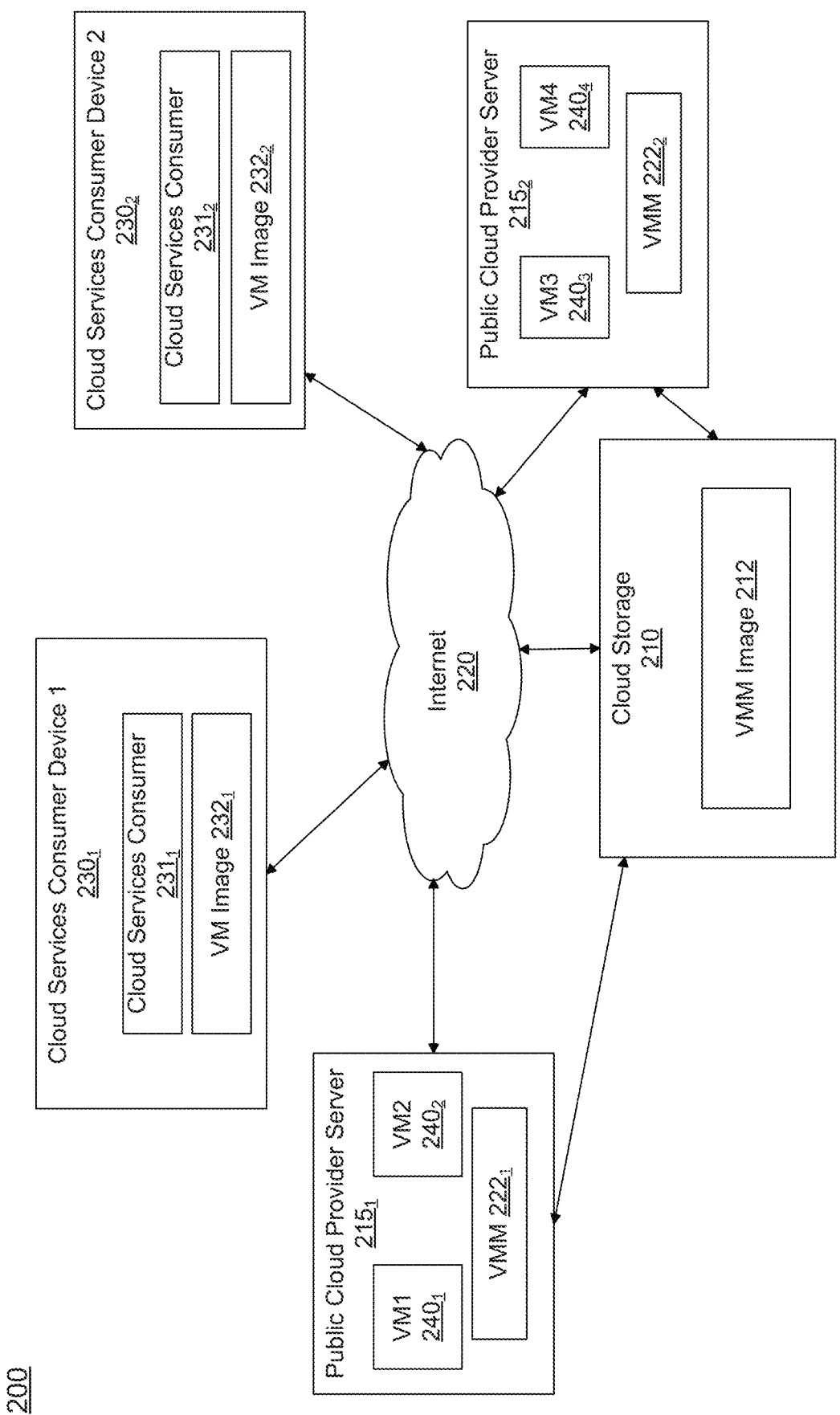
FIG. 2 is a block diagram of a cloud services environment that can be used to implement embodiments.

Referring now to FIG. 2, shown is a block diagram of a cloud services environment in accordance with an embodiment of the present invention. As shown in FIG. 2, network 200 can be used to allow consumers to request services, including virtualization services, from a public cloud services provider. As seen, network 200 can correspond to any type of communications network and can include many different types of computing devices interconnected via a given network such as Internet 220.

Cloud storage 210 can be provided as part of a data center that includes various computing devices, storage devices and so forth. As one example, cloud storage 210 can be a storage device that includes multiple storage components such as disks, optical, or semiconductor-based storage. Cloud storage 210 can act, for example, as a repository of master copies of various applications, including a virtual machine monitor (VMM) application that instantiates virtual machines to provide services in response to a consumer's request. In the embodiment shown in FIG. 2, a master copy of a VMM application is stored in the form of VMM image 212. VMM image 212 is a software image containing a software stack designed to provide a virtual machine platform in the form of a virtual machine monitor (VMM).

Thus as further seen in FIG. 2, at the same location, e.g., as part of the same data center, one or more public cloud services provider servers, such as public cloud provider servers $215_1$ and $215_2$ can be coupled to cloud storage 210. In various embodiments, public cloud services provider servers can be used to service consumer services requests, including virtualization requests. For example, each public cloud services provider server may host one or more virtual machines on behalf of a consumer. In the example shown in FIG. 2, public cloud provider server $215_1$ hosts two virtual machines, VM1 $240_1$ and VM2 $240_2$. Similarly, public cloud provider server $215_2$ hosts two virtual machines, VM1 $240_3$ and VM2 $240_4$. In the embodiment shown, each of public cloud provider servers $215_1$ and $215_2$ also executes a respective VMM instance of VMM image 212 as VMM $222_1$ and VMM $222_2$.

As shown in FIG. 2, various consumer devices can be present, e.g., cloud services consumer devices $230_1$ and $230_2$. Such cloud services consumer devices may be personal devices of a given user such as a smartphone, tablet computer, desktop computer or so forth. Alternatively, cloud services consumer devices may be servers for an organization that consumes cloud services. In addition, cloud services consumer devices may be emulated via software or themselves run within virtual machines (VMs). In other words, an emulator or simulator can emulate the cloud provider's hardware in software such that the consumer may run emulators of the cloud provider's hardware on the consumer's devices.

Each of cloud services consumer devices $230_1$ and $230_2$ provides a respective cloud services consumer $231_1$ and $231_2$ and a respective VM image $232_1$ and $232_2$. Cloud services consumers $231_1$ and $231_2$ may be, for example, a client component of a cloud services application used to request cloud services. Cloud services consumers such as cloud services consumers $231_1$ and $231_2$ are referenced herein as "consumers." VM images $232_1$ and $232_2$ may be stored in storage (not shown) coupled to the respective cloud services consumer devices $230_1$ and $230_2$. These VM images are provided by the consumer to the cloud services provider and used to create a secure VM, such as VM1 $240_1$, running on the cloud provider's server $215_1$.

When a secure VM has been established on the cloud services provider's server in accordance with the techniques described herein, the consumer may then use that VM, with the consumer's secret keys, to create additional VMs on behalf of the consumer. Thus, once one consumer VM can be securely established in the cloud services provider's cloud, that VM can then perform all the operations of the consumer devices in FIG. 2, including creating additional secure VMs. Likewise, a consumer can establish secure VMs with multiple cloud services providers and these secure VMs can interact securely via secure communications channels using the consumer's secret keys.

Figure 3:
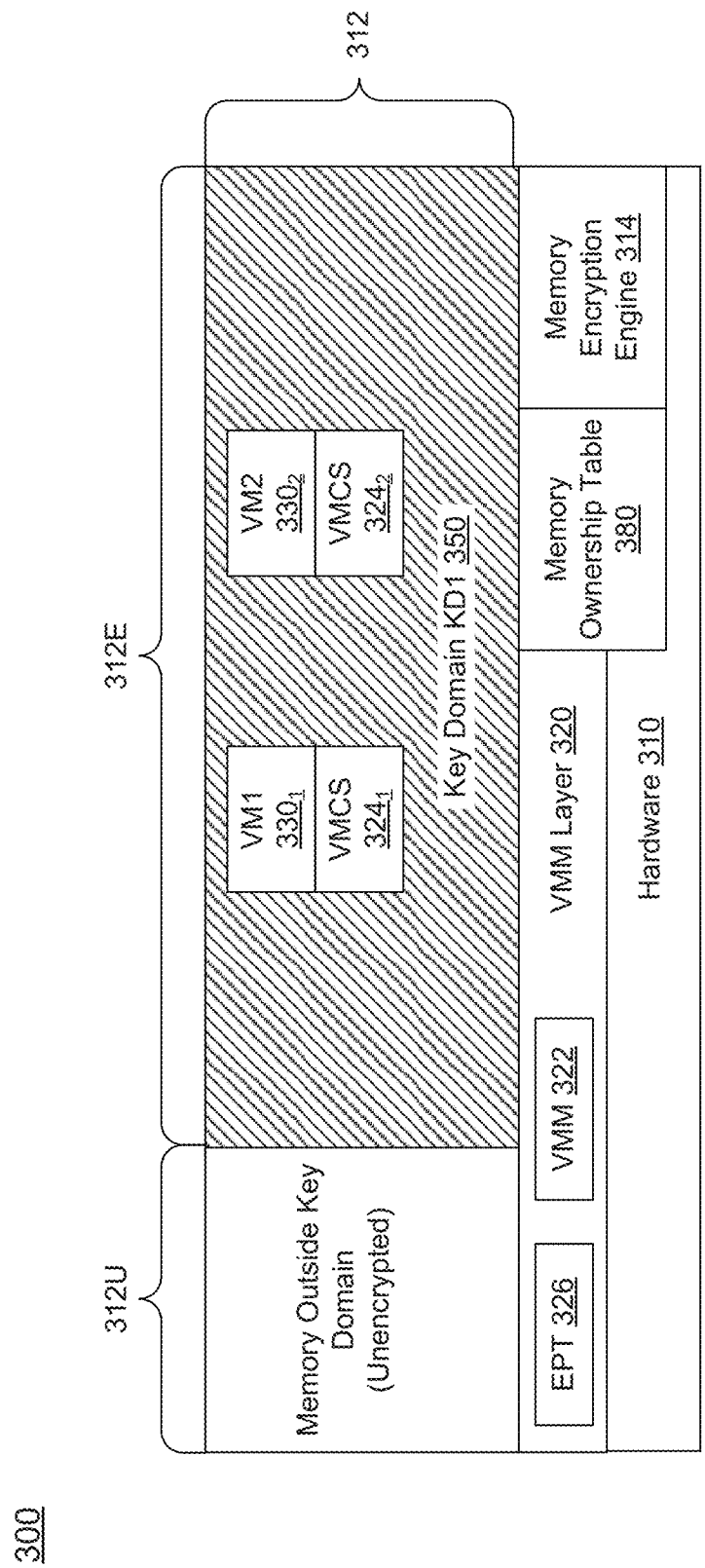
FIG. 3 is a diagram showing a server environment that can be used to implement embodiments.

Referring to FIG. 3, an environment 300 consistent with the present disclosure is presented. Environment 300 includes a hardware layer 310, a guest workload layer (i.e., a Virtual Machine Monitor (VMM) layer 320), and a memory 312. Memory encryption engine 314 are shown as part of hardware 310. Memory encryption engine 314 is shown adjacent to memory 312 to illustrate that memory encryption engine 314 is used to encrypt and/or decrypt memory 312. Memory encryption engine 314 is also shown adjacent to memory ownership table (MOT) 380 to show that memory encryption engine 314 is used to encrypt and/or decrypt MOT 380. Within VMM layer 320, a VMM 322 manages virtual machines and maintains an Extended Page Table (EPT) 326.

Hardware layer 310, including memory encryption engine 314, and VMM layer 320 share a memory ownership table (MOT) 380. Memory ownership table 380 is used to map a guest VM's guest address to an actual hardware physical address (HPA). In one embodiment, a guest VM can use MOT 380 to verify that a physical address being used by the host VMM (referred to herein as a "workload manager-provided hardware physical address") for a given guest physical address is consistent with the guest VM's memory mappings.

In some embodiments, portions of an encrypted guest image (e.g., memory pages) may be cryptographically bound to particular physical memory addresses. This binding assures that the encrypted memory image cannot simply be copied or moved to alternate memory locations without the guest's/consumer's knowledge. The guest VM can use the memory ownership table 380 to verify that the guest physical addresses (GPAs) used to access its encrypted memory image are mapped to the correct memory contents. The MOT links the guest's GPAs to the host's hardware physical addresses (HPAs), and thus the guest VM can be assured that the guest addresses reference the expected/correct encrypted memory contents.

By encrypting a mapping for the guest workload with the consumer-provided key, the respective original guest address of the mapping is bound to the respective original hardware physical address of the mapping. In addition, by encrypting contents written by the guest workload with the consumer-provided key, the respective original guest address of the mapping is bound to the encrypted contents of the respective original hardware physical address of the mapping.

Memory 312 is illustrated as including two portions, an unencrypted memory portion 312U that represents memory outside a key domain 350 (or possibly belonging to another separate key domain and thus encrypted using a different key), and an encrypted memory portion 312E that represents memory within key domain 350. Virtual machines 330$_1$ and 330$_2$ are shown within key domain 350. Virtual machines 330$_1$ and 330$_2$ have corresponding Virtual Machine Control Structures (VMCSs) 324$_1$ and 324$_2$. Note that both VMCSs 324$_1$ and 324$_2$ are within the key domain 350 and are therefore encrypted by the key domain key for key domain 350.

Each consumer provides its own key for encrypted memory and is assigned a key domain ID (KD_ID) (shown as KD1). The consumer's allocated memory, encrypted with the consumer's key domain key, may contain multiple VMs including VMCS structures. The VMM has no access to the consumer's memory as it is encrypted, but the VMM can launch the VMs within using the VMCS's within the encrypted memory regions. As the VMM can still remap the executing consumer's memory, a memory ownership table is also used to check that the memory mappings used by the host VMM (the "workload manager-provided host physical addresses") match the expected hardware physical addresses of the consumer's guest VM and correspond to the memory image contents encrypted with the consumer's key.

In one embodiment, an encryption technique called a tweakable block cipher is used. A tweakable block cipher accepts a second input, called a tweak, along with plaintext or ciphertext input to be encrypted. The tweak, along with the key, selects the permutation computed by the cipher. In encrypting the consumer image, the server's hardware physical address into which the consumer image is to be loaded is used as the tweak, making the resulting encrypted consumer image memory position-dependent. The encrypted consumer image is described as memory position-dependent because the encrypted consumer image must be loaded into the correct VMM-designated hardware physical addresses of the cloud services provider's server before the encrypted consumer image can be correctly decrypted.

In one embodiment, the consumer image is encrypted using XEX-based tweaked codebook mode with ciphertext stealing (XTS). The consumer encrypts the consumer image in memory position-dependent XTS mode using page address tweaks and the key domain key. The correct physical addresses of where the consumer image will be loaded are included in the XTS tweak for each block encrypted. Other tweakable ciphers may also be used in other embodiments, such as Liskov, Rivest, and Wagner (LRW) or counter mode cipher.

Because the consumer image is encrypted using a memory position-dependent "tweaked" cipher, an adversary cannot move parts of the consumer image around in memory. The page tables map the consumer image's programs and data to the correct physical memory addresses on the cloud services provider's server, so program behavior cannot be maliciously changed given that the consumer image is cryptographically bound to the correct physical memory locations. In other words, the consumer image cannot be decrypted correctly if the consumer image is not loaded into the correct physical memory locations on the cloud services provider's server. Furthermore, integrity check values (for example, a Message Authentication Code (MAC) or hashed MAC (HMAC) based on SHA2/3 secure hash algorithm of the memory contents) can be used to detect any attempts to modify the consumer image contents and/or the location in memory into which the consumer image is loaded.

Because the consumer's image may be cryptographically bound to the physical address locations, the memory ownership table (MOT) maps the guest physical addresses (GPAs) to the expected hardware physical addresses (HPAs) at which the image is cryptographically bound. This MOT mapping enables the guest VM to ensure that, when the VM accesses memory at a particular GPA, the guest VM is accessing the expected memory image contents for that same guest physical address.

Figure 4:
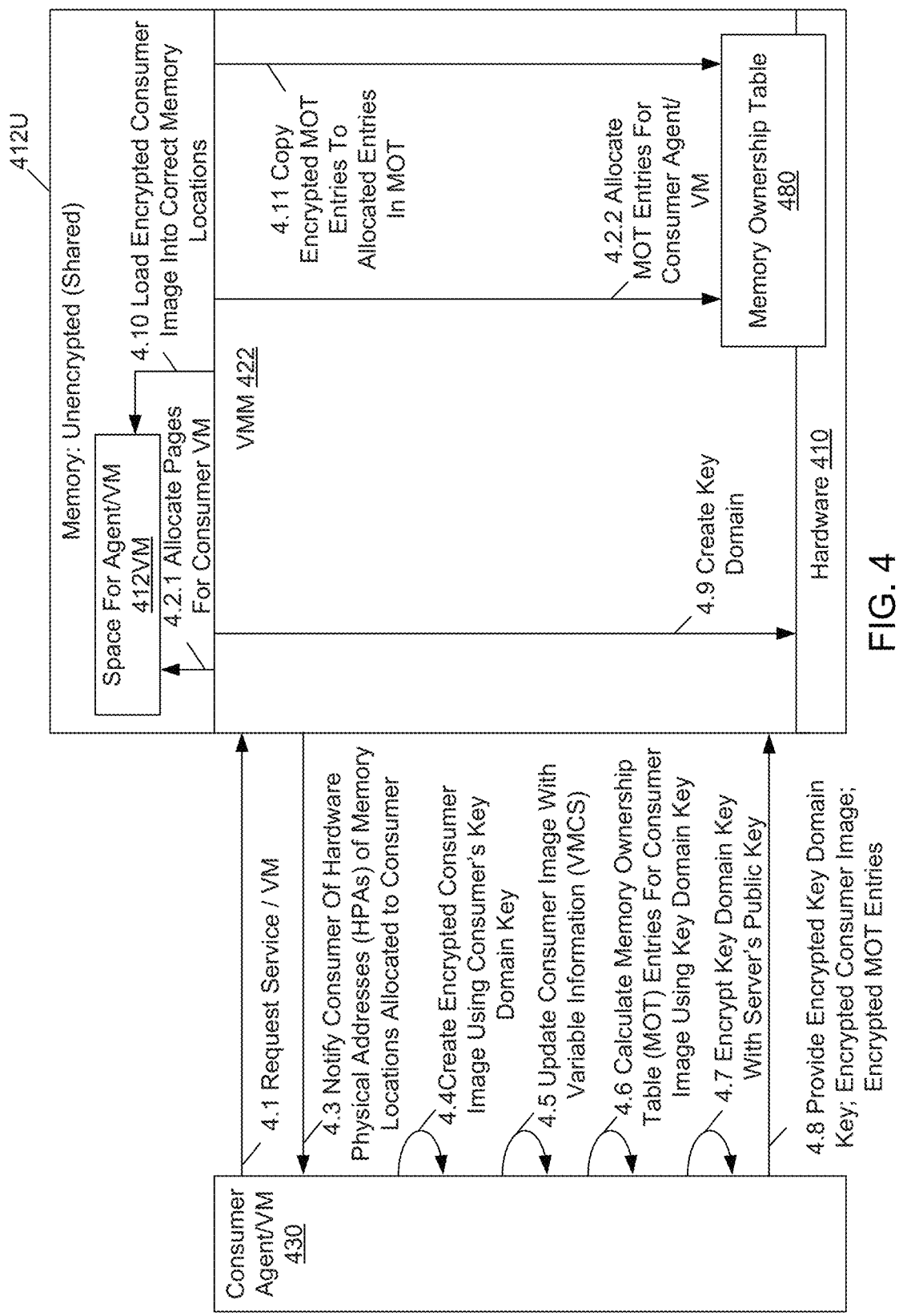
FIG. 4 is a diagram showing data flows between a consumer agent and components of a server environment in accordance with embodiments.

Referring to FIG. 4, data flows to provide a protected region of memory for a guest workload/virtual machine (VM) are shown between a consumer agent/VM, host management software/virtual machine monitor (VMM), and hardware. Consumer/agent 430 may represent, in various embodiments, a remote machine owned by a consumer, an agent operating on behalf of the consumer, the consumer's guest VM, a trusted third party that creates consumer images on behalf of the consumer, or a trusted embedded system (e.g., a Converged Security and Manageability Engine (CSME) as provided by Intel®. In action 4.1, consumer agent/VM 430 requests a service from a cloud services provider, which results in instantiation of a virtual machine to manage the consumer's workload. In action 4.2.1, VMM 422 allocates space (i.e., pages) 412VM from unencrypted (shared) memory 412U for the consumer agent/VM 430. In action 4.2.2, VMM 422 allocates entries in a memory ownership table 480 for the consumer agent/VM. The memory ownership table 480 will be used to verify the mappings between the consumer agent/VM 430 guest physical addresses to the consumer agent/VM's expected hardware physical addresses. Determination of the expected hardware physical addresses of the consumer agent/VM 430 is described in further detail below.

In action 4.3, VMM 422 notifies consumer agent/VM 430 of the hardware physical addresses (HPAs) of the memory locations 412VM allocated for the consumer agent/VM 430 in action 4.2.1. These hardware physical addresses may include hardware physical addresses of pages in memory (such as pages into which the consumer image is to be loaded), hardware physical addresses for page tables, interrupt descriptor table register information, and other hardware physical addresses for the server(s) that are servicing the consumer's request. Besides the physical addresses used for constructing (XTS encrypting) the pages of the VM's memory image, the consumer will use the physical addresses to populate the VMCS structure(s) and MOT entries. As described earlier, these hardware physical addresses are referred to herein as memory position-dependent address information because specific types of data (e.g., page tables) must be loaded into the correct VMM-designated hardware physical addresses on the server for the consumer agent/VM to execute properly.

In action 4.4, consumer agent/VM 430 creates an encrypted consumer image using its own consumer-generated key domain key. In one embodiment, the consumer agent/VM encrypts the consumer image using the hardware physical addresses provided by the cloud services provider's VMM 422.

In action 4.5, the consumer may include in the encrypted consumer image a VMCS structure configured according to the server/VMM's specification for properly launching the consumer's guest VM. For example, the VMCS defines the state of a virtual machine's virtual processor. As noted above, the location of the page into which the consumer's VM image is to be loaded was provided by the cloud service provider as memory position-dependent address information so that the consumer's image can be loaded into the correct VMM-designated hardware physical addresses on the server to enable the consumer agent/VM to execute properly. The VMCS structure may be used to update an already-encrypted consumer image.

In action 4.6, memory ownership table entries are also calculated for the expected hardware physical addresses associated with the consumer image. These memory ownership table entries are associated with a particular VM and include a mapping from each guest physical address (GPA) of the VM's page tables to the VM's expected hardware physical address (expected HPA) on the cloud service provider's server. When a VM requests to retrieve data for a virtual/linear address mapped to a given guest physical address (GPA), the actual VMM-designated (workload manager-provided) hardware physical address (HPA) from which the data are to be retrieved can be verified. This verification can be performed by comparing the expected hardware physical address (HPA) corresponding to the GPA to the actual workload manager-provided hardware physical address (HPA) from which the code/data are to be retrieved. If the expected HPA does not match the actual HPA for a given GPA, the requesting VM may assume that the VMM has been compromised, abort the read or write command, and exit processing. In addition, the key domain key may be revoked. If the expected HPA does match the actual HPA for the given GPA, the requesting VM may execute an exception/default handler and encrypt the memory ownership table entry with the requesting VM's key domain key.

In action 4.7, the consumer establishes the memory encryption key with the cloud services provider's server by encrypting the symmetric key used to encrypt the consumer image (i.e., the key domain key) with the cloud service provider server's public key. The server hardware will then prevent disclosure of the key domain key to the cloud services provider, the cloud services provider's VMM, and other potential adversaries.

In action 4.8, consumer agent/VM 430 provides the encrypted key domain key, encrypted consumer image including VMCS(s) and associated structures, and encrypted memory ownership table entries to VMM 422.

In action 4.9, VMM 422 creates a key domain for the consumer agent/VM by issuing a Create Key Domain (CreateKD) command to a processor (not shown) within hardware 410.

In action 4.10, VMM 422 loads the encrypted consumer image into the correct memory locations on the cloud services provider's server (at the hardware physical addresses allocated to the consumer agent/VM 430 in action 4.2.1 and communicated to the consumer agent/VM 430 in action 4.3).

In action 4.11, VMM 422 copies the encrypted memory ownership table entries provided by consumer agent/VM 430 to the entries in the memory ownership table 480 that were allocated for the consumer agent/VM 430 in action 4.2.2. As a result, memory ownership table 480 contains mappings from guest physical addresses used by consumer agent/VM 430 to expected hardware physical addresses in the cloud services provider's server memory 412U.

The cloud services provider can select or generate a key domain identifier KD_ID for the newly-provided encrypted key domain key. Upon execution of the Create_KD instruction, the CPU within hardware 410 that is creating the key domain flushes any previously-used key domain identifiers for the consumer agent/VM 430 from memory. The CPU also flushes caches associated with any previously-used key domains and programs the memory encryption engine with the key domain key associated with the newly-generated key domain identifier.

Figure 5:
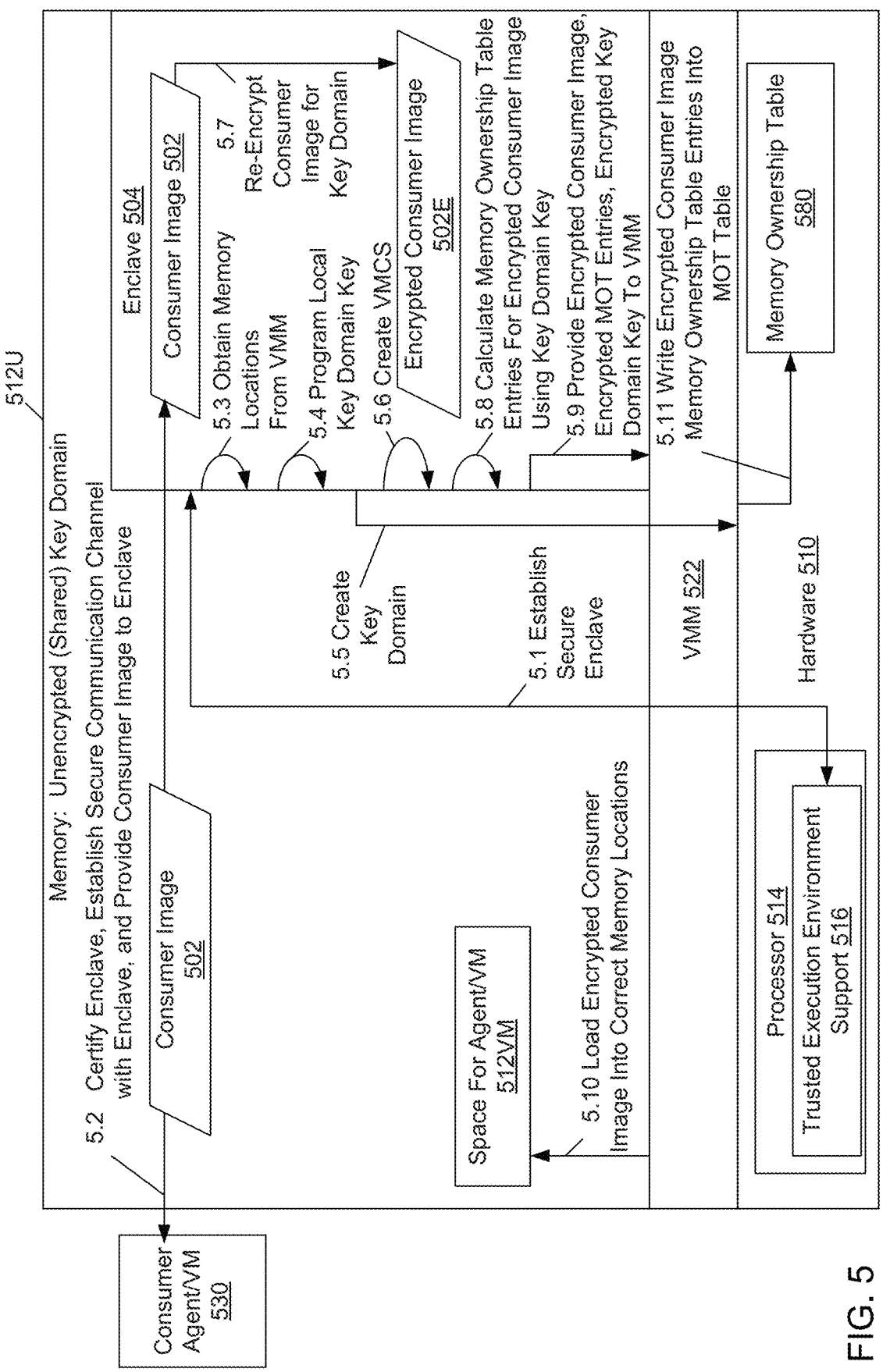
FIG. 5 is a diagram showing data flows between a consumer agent and components of a server environment in accordance with embodiments.

Referring to FIG. 5, a cloud services provider may use a secure enclave as an alternative method to provide a protected region of memory for running the consumer's workload. FIG. 5 shows a point in time when space 512VM for the consumer agent/VM 530 has been allocated within unencrypted memory 512U, as described above with reference to action 4.2.1 of FIG. 4. Furthermore, VMM 522 has also allocated entries within memory ownership table 580, as described above with reference to action 4.2.2 of FIG. 4.

FIG. 5 shows an embodiment for establishing the consumer's guest workload within the protected region of the cloud services provider's memory. In one embodiment, the consumer provides an encrypted image to an enclave running on the cloud services provider's server. The consumer's image is encrypted so that the cloud services provider cannot read the image. In one embodiment, the consumer's image may be encrypted by sending the consumer's unencrypted image via secure network protocols such as TLS/SSL/IPSec that terminate inside the enclave. The enclave re-encrypts the image for the local server to create the encrypted memory image that will execute locally.

To provide a protected region of memory for the consumer workload, in action 5.1, VMM 522 uses a trusted execution environment support 516 feature of a processor 514 within hardware 510 to establish a secure enclave 504 within shared unencrypted memory 512U. Within enclave 504, executing code may be measured, verified, and/or otherwise determined to be authentic. Additionally, code and data included in the enclave 504 may be encrypted or otherwise protected from being accessed by code executing outside of enclave 504. For example, code and data included in the secure enclave 504 may be protected by hardware protection mechanisms of the processor 514 while being executed or while being stored in certain protected cache memory of the processor 514. The code and data included in the secure enclave 504 also may be encrypted when stored in a shared cache or the main memory. The trusted execution environment support 516 may be embodied as a set of processor instruction extensions that allows the processor 514 to establish one or more secure enclaves in the memory. For example, the trusted execution environment support 516 may be embodied as Intel® Software Guard Extensions (SGX) technology. Alternatively, an embedded trusted execution environment (e.g. Intel's Converged Security and Manageability Engine (CSME)) or other environment providing a secure mode of operation (e.g. System Management Mode (SMM)/Intel® Trusted Execution Technology (TXT)) can perform similar operations to provide an initial encrypted memory image.

In action 5.2, consumer agent/VM 530 obtains a certificate from enclave 504 and verifies the certificate. After certifying enclave 504, consumer agent/VM 530 establishes a secure communication channel to enclave 504 and provides a consumer image 502 to enclave 504 via the secure communication channel.

In action 5.3, enclave 504 obtains hardware physical addresses (HPAs) of the memory locations 512VM previously allocated for the consumer agent/VM 530 from VMM 522. These hardware physical addresses of memory locations 512VM are to be loaded with encrypted code for consumer image 502.

In action 5.4, enclave 504 programs a local key domain key that will be used to encrypt memory locations/hardware physical addresses making up the key domain for consumer agent/VM 530. The key domain key is local to enclave 504 in the sense that the key domain key is used to encrypt memory locations on the same server as enclave 504.

In action 5.5, enclave 504 issues a Create Key Domain (Create_KD) instruction to a processor within hardware 510, such as processor 514.

In action 5.6, enclave 504 creates a VMCS for the consumer agent/VM 530. The VMCS is to be stored at a particular hardware physical address/memory location provided by VMM 522 in action 5.3.

In action 5.7, enclave 504 encrypts the consumer image 502 using the key domain key to produce encrypted consumer image 502E. As described above with reference to action 4.4 of FIG. 4, a tweakable block cipher is used. In encrypting the consumer image, the server's hardware physical address into which the consumer image is to be loaded is used as the tweak, making the resulting encrypted consumer image memory position-dependent. The encrypted consumer image is described as memory position-dependent because the encrypted consumer image must be loaded into the correct VMM-designated hardware physical addresses of the cloud services provider's server before the encrypted consumer image can be correctly decrypted.

In action 5.8, enclave 504 calculates memory ownership table entries for the encrypted consumer image 502E using the key domain key. These memory ownership table entries will map the guest physical addresses from the guest VM's page tables to expected hardware physical addresses into which the enclave 504 expects the encrypted consumer image to be loaded. These expected hardware physical addresses are based upon the hardware physical addresses provided by the VMM 522 in action 5.3.

In action 5.9, enclave 504 provides the encrypted consumer image, encrypted memory ownership table entries, and the encrypted key domain key to the VMM 522. Alternatively, in action 5.9, enclave 504 may write the encrypted consumer image directly into the correct memory locations designated by VMM 522 rather than providing the encrypted consumer image to VMM 522.

In action 5.10, VMM 522 loads the encrypted consumer image 502E into the memory locations that were obtained by enclave 504 from VMM 522 in action 5.3.

In action 5.11, VMM 522 writes the encrypted consumer image memory ownership table entries into the memory ownership table 580.

Figure 6A:
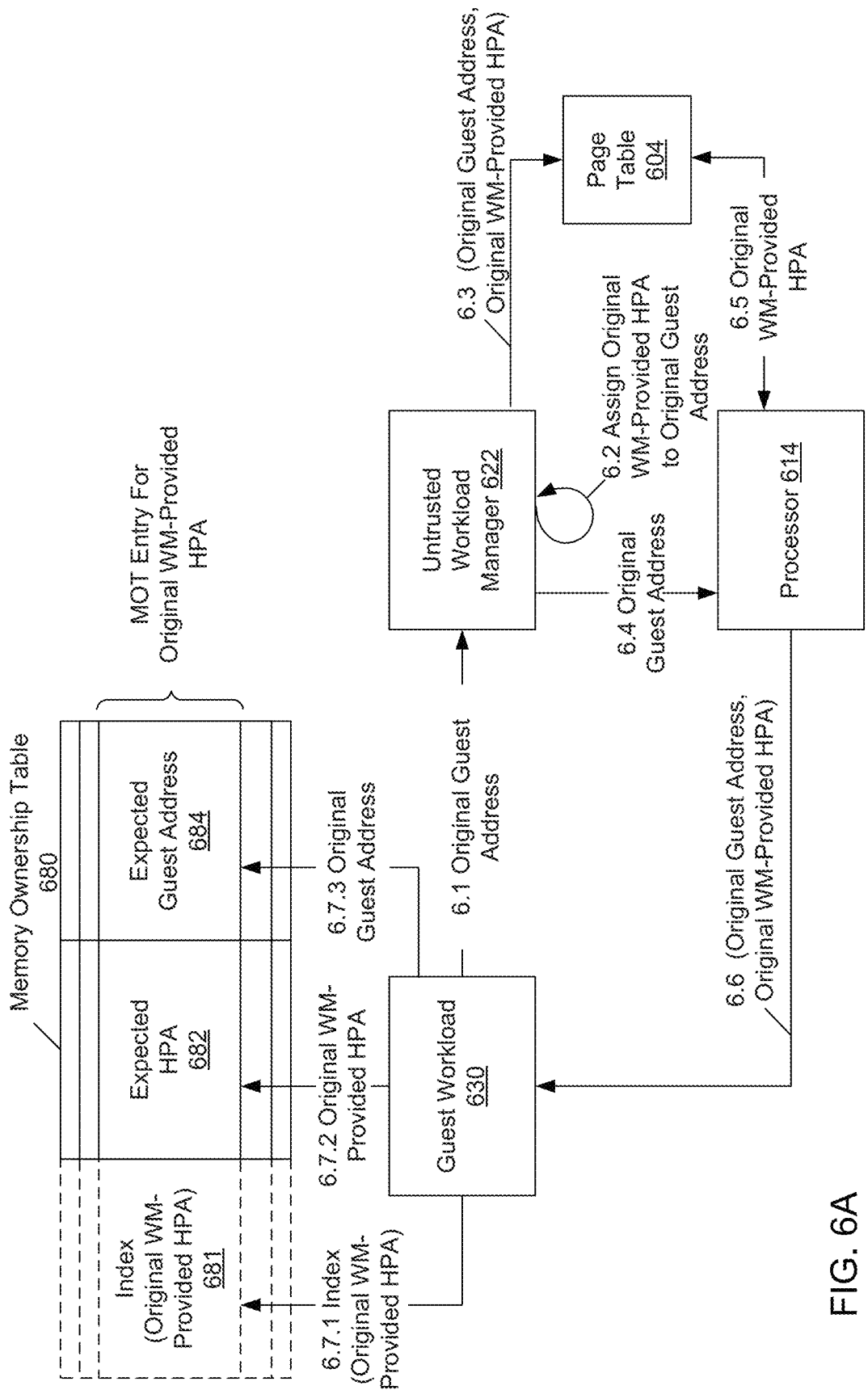

Referring to FIG. 6A, a data flow is shown for establishing a memory ownership table (MOT) entry for a mapping from an original guest address provided by a guest workload/guest VM to an original workload manager-provided hardware physical address. The original guest address may be a guest virtual address or a guest physical address, depending upon the nature of the guest workload 630 and the nature of the workload manager 622. In action 6.1, guest workload 630 provides the original guest address to workload manager 622. In action 6.2, untrusted workload manager 622 assigns an original workload manager-provided hardware physical address to the original guest address. In action 6.3, untrusted workload manager 622 stores the original workload manager-provided hardware physical address with the original guest address in a page table 604. For example, in the case where untrusted workload manager 622 is a VMM, page table 604 may be an extended page table providing second-level address translation.

In action 6.4, untrusted workload manager 622 provides the original guest address received from the guest workload/guest VM 630 to processor 614. In action 6.5, processor 614 looks up the original guest address in page table 604 to obtain the original workload manager-provided hardware physical address. In action 6.6, processor 614 returns the original workload manager-provided hardware physical address for the original guest address. In action 6.7.1, guest workload 630 uses the original workload manager-provided hardware physical address as an index into memory ownership table 680 to store entries related to the original guest address. Guest workload 630 creates an entry in MOT table 680 by writing the original workload manager-provided hardware physical address to an expected HPA field 682 in action 6.7.2 and the original guest address to an expected guest address 684 in action 6.7.3. The guest workload may also encrypt the entry using the guest workload's secret key domain key (memory encryption key) unknown by the VMM. By encrypting the MOT entry with the guest workload's key domain key, the guest workload 630 protects against MOT entries that have been forged by a compromised host workload manager/VMM.

By storing the original guest address value assigned by the guest workload 630 in an entry with the original workload manager-provided hardware physical address provided by the untrusted workload manager 622, the memory ownership table 680 preserves the originally-assigned values for future reference. In particular, the originally-assigned values will be the expected HPA and expected guest address values for an entry indexed by the original workload manager-provided hardware physical address. The expected values for the HPA and guest address can be compared to the values received in action 6.6 and used to verify the values received in action 6.6.

Referring to FIG. 6B, a data flow is shown retrieving an entry in memory ownership table 680 for a requested guest address. In action 6.8, guest workload 630 provides a requested guest address to untrusted workload manager 622. In action 6.9, untrusted workload manager 622 passes the requested guest address to processor 614 for translation to a workload manager-provided hardware physical address. In action 6.10, using page table 604, processor 614 translates the requested guest address into a translated workload manager-provided hardware physical address. In action 6.11, processor 614 searches the memory ownership table 680 for entries corresponding to the translated workload manager-provided hardware physical address. If an entry in the memory ownership table 680 is found corresponding to the translated workload manager-provided hardware physical address, a key domain key/memory encryption key for the executing guest workload 630 is used to attempt to decrypt the found MOT entry.

In action 6.12, processor 614 verifies that the translated workload manager-provided hardware physical address has the values expected by the guest workload 630. In one embodiment, the translated workload manager-provided hardware physical address is verified if the following conditions are met: (i) the MOT entry decrypted correctly using the running guest workload's key domain key (memory encryption key), (ii) the expected hardware physical address 682 matches the translated workload manager-provided hardware physical address used as an index into the MOT 680, and (iii) the requested guest address matches the expected guest address 684 for the same index. In action 6.13, processor 614 provides the verified translated workload manager-provided hardware physical address to guest workload 630 as the hardware physical address for the requested quest address. If the processor 614 does not verify the translated workload manager-provided hardware physical address, then the processor 614 may call an interrupt or error handler to cause the guest workload 630 to exit or perform other error-handling processes.

Figure 7:
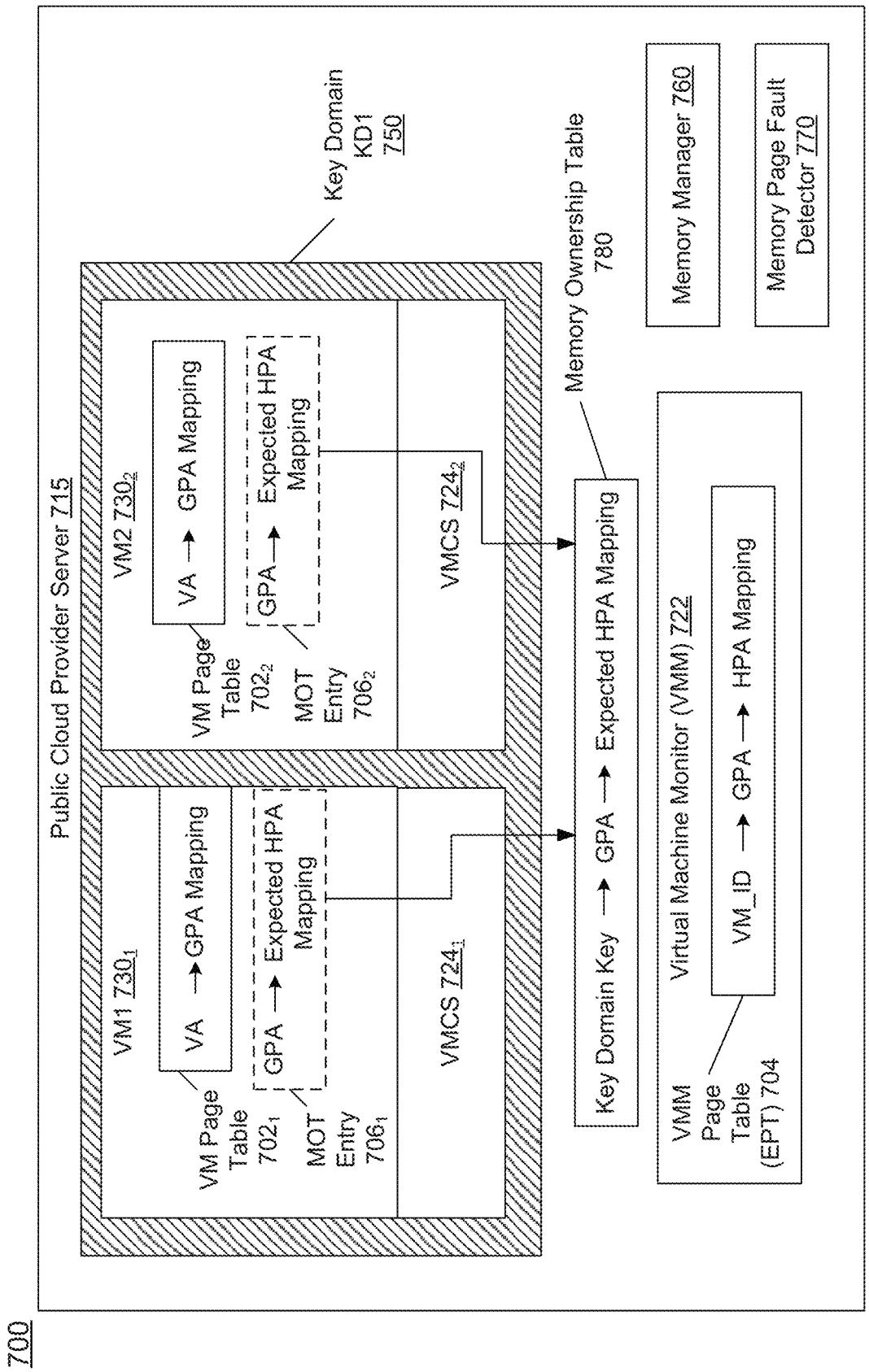
FIG. 7 is a diagram showing data flows between components of a server environment in accordance with embodiments.

Referring now to FIG. 7, in use, a public cloud provider may establish an environment 700 for protecting guest workloads instantiated on a public cloud provider server 715. The illustrative environment 700 includes a virtual machine monitor (VMM) 722 and one or more virtual machines (VMs) 730$_i$, a memory manager 760, and a memory page fault detector 770. Some of the components of the environment may be embodied as hardware, firmware, software, or a combination thereof. As such, in some embodiments, one or more of the components of the environment 700 may be embodied as circuitry or collection of electrical devices (e.g., a memory manager circuit 760, a memory page fault detector circuit 770, etc.). It should be appreciated that, in such embodiments, one or more of the memory manager circuit 760 and/or the memory page fault detector circuit 770 may form a portion of one or more of a compute engine, a processor, an I/O subsystem, a communication subsystem, and/or other components of the public cloud provider server 715. Additionally, in some embodiments, one or more of the illustrative components of the environment 700 may form a portion of another component and/or one or more of the illustrative components may be independent of one another. Further, in some embodiments, one or more of the components of the environment 700 may be embodied as virtualized hardware components or emulated architecture, which may be established and maintained by a compute engine or other components of the public cloud provider server 715.

The virtual machine monitor (VMM) 722 is configured to instantiate the virtual machines 730$i$ on the public cloud provider server 715. The VMM 722 allocates hardware physical addresses to each virtual machine 730$_i$. VMM 722 creates Extended Page Tables (EPTs) that take the guest physical addresses (assigned by the VM) and maps those guest physical addresses to actual physical addresses used by hardware (HPAs). In one embodiment, hardware physical addresses are assigned as memory pages (fixed-size chunks of memory).

In one embodiment, each virtual machine (VM) 730$_i$ is configured to execute a consumer image provided by the consumer for which the virtual machine is instantiated. Each virtual machine 730$_i$ establishes a VM page table 702$_i$ to store a translation mapping between virtual/linear addresses (VA) of the virtual machine and the guest physical addresses (GPA) corresponding to the hardware physical addresses allocated to the VM 730$_i$ by the virtual machine monitor 722. To do so, the virtual machine 704 may generate a VA→GPA mapping that is used to translate a virtual/linear address to a guest physical address. VMM 722 may use extended page tables (EPTs) to map a GPA to a hardware physical address (HPA).

In one embodiment, to keep track of the VM 730$_i$ with the assigned guest physical address range, the VMM 722 may further generate a virtual machine identifier (VM_ID) associated with each VM 730$_i$ and include a VM_ID→GPA→HPA entry in the VMM page table 704. The VM_ID identifier uniquely identifies each virtual machine 730$_i$ instantiated on the public cloud provider server 715. Other means of identifying a virtual machine 730$_i$, such as an address space identifier or a key domain identifier, may also be used.

As discussed above, in some cases, the virtual machine monitor 722 may be compromised and may attempt to maliciously change the mappings from a VM's guest physical addresses to host physical addresses. To ensure that the public cloud provider server 715 is not maliciously compromised, the VM 730$_i$ may provide an entry to be saved in a memory ownership table 706. The memory ownership table entries 706$_1$ and 706$_2$ preserve the original GPA→expected HPA mappings, encrypted with the VM 730$i$'s key domain key. Memory ownership table 706 therefore contains encrypted entries designating a Key domain key→GPA→expected HPA mapping entry. The VM_ID or KD_ID is used to select the key domain key to be used to decrypt an MOT entry.

The memory manager 760 is configured to manage memory requests from virtual machines 730$_i$, while providing security to the virtual memory of the virtual machines 730$_i$. In use, the memory manager 760 is configured to receive a memory access request, including a virtual/linear address, from a virtual machine 730$_i$. In response to the memory access request, the memory manager 760 performs a translation of the virtual/linear address to a translated hardware physical address of the public cloud provider server 715 using the VM page table 702$_i$ associated with the requesting virtual machine 730$_i$ and the VMM page table (also referred to as the extended page table (EPT)) 704 associated with the virtual machine monitor 722.

To provide security to the virtual memory of the virtual machines 730$_i$, the memory manager 760 may be configured to verify the translation of the guest address to the translated hardware physical address. In one embodiment, the verification is based on a comparison of the translated hardware physical address for a given guest physical address to an expected host physical address stored in memory ownership table 706 for that given guest physical address (GPA).

The memory page fault detector 770 is configured to detect a memory page fault, which may occur during an address translation using the page tables associated with a virtual machine 730$_i$ or the virtual machine monitor 722. For example, the memory page fault detector 770 may detect a memory page fault when a translated physical address (e.g., a translated guest physical address and/or a translated hardware physical address) does not exist in a corresponding page table. For example, when the memory manager 770 translates a virtual/linear address of a virtual machine 730$_i$ to a translated guest physical address, the memory page fault detector 770 determines whether the translated guest physical address is present in the VM page table 702$_i$ associated with the virtual machine 730$_i$. If the translated guest physical address is not present in the VM page table 702$_i$, the memory page fault detector 770 generates a memory page fault. Additionally, when the memory manager 760 translates the translated guest physical address to a translated hardware physical address, the memory page fault detector 770 determines whether the translated hardware physical address is present in the VMM page table 704 associated with the virtual machine monitor 722. If the translated hardware physical address is not present in the VMM page table 704, the memory page fault detector 770 generates a memory page fault or VMExit to exit the guest VM. In some embodiments, the memory page fault detector 770 may alert a user that the public cloud provider server 715 has been compromised or may revoke the key domain key so that the VMM is unable to continue executing the VM.

Figure 8:
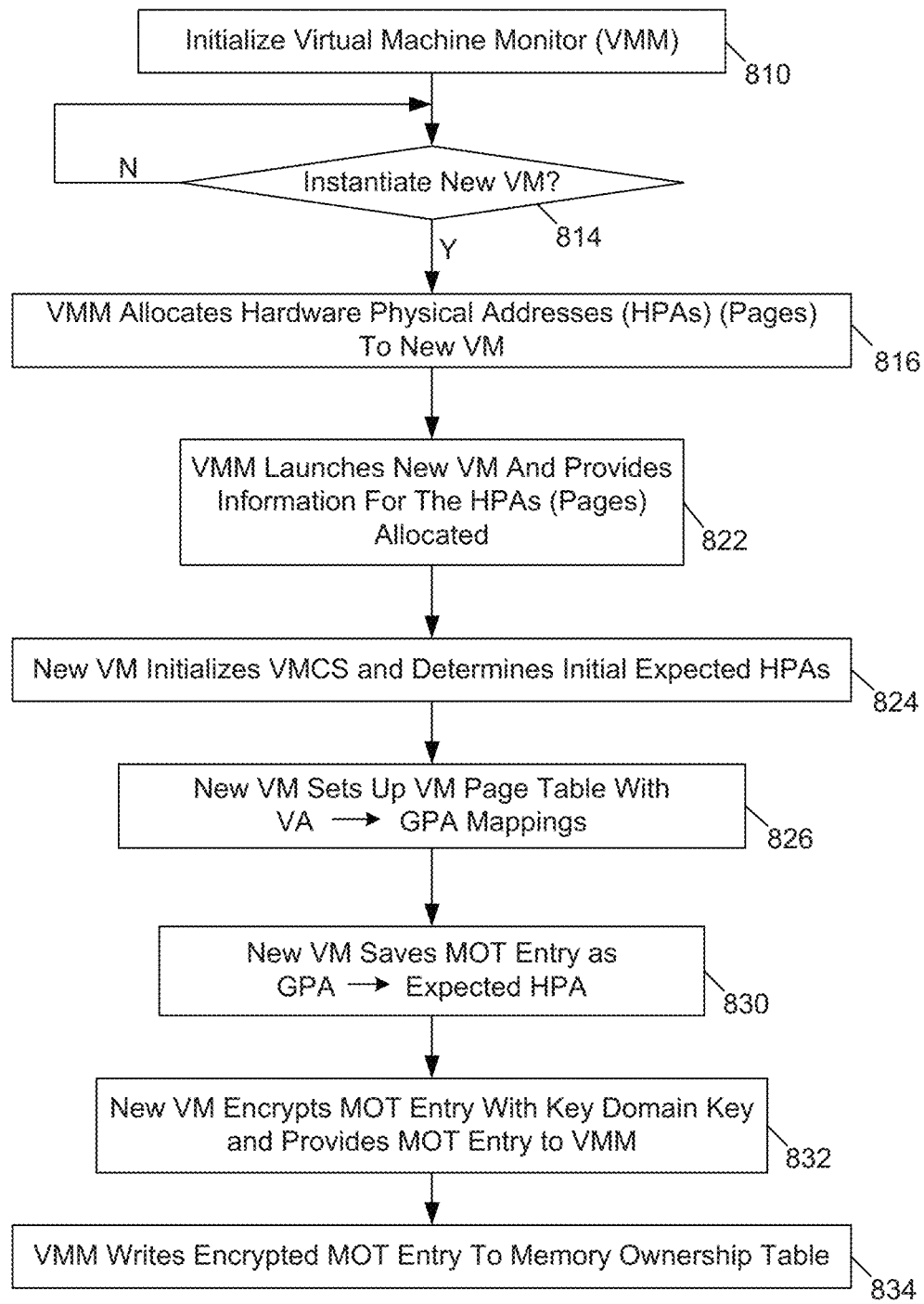
FIG. 8 is a flowchart of a method performed in accordance with embodiments.

Referring to FIG. 8, a flowchart illustrates a method 800 that may be performed by a cloud services provider server to establish a memory ownership table in accordance with one embodiment of the invention. At "Initialize Virtual Machine Monitor (VMM)" block 810, a host workload manager in the form of a virtual machine monitor is initialized on a cloud services provider server. As described above, the host workload manager may correspond to an operating system in a non-virtualized environment; the description of the VMM as a host workload manager herein applies equally to the operating system or other workload manager in non-virtualized environments.

The VMM of FIG. 8 may instantiate a guest workload in the form of a guest virtual machine (VM) to provide a cloud service to a requesting consumer. At "Instantiate New VM?" decision point 814, a determination is made by the host workload manager/VMM whether to instantiate a new guest workload/guest VM. A new guest workload/guest VM may be instantiated, for example, when a new request for cloud services is received from a consumer. If a new VM is not to be instantiated at "Instantiate New VM?" decision point 814, control returns to "Instantiate New VM?" decision point 814 and the VMM continues to wait for the need for a new guest workload/guest VM to be instantiated. If a new guest workload/guest VM is to be instantiated at "Instantiate New VM?" decision point 814, control proceeds to "VMM Allocates Hardware Physical Addresses (HPAs) (Pages) to New VM" block 816.

At "VMM Allocates Hardware Physical Addresses (HPAs) (Pages) to New VM" block 816, the host workload manager/VMM allocates hardware physical addresses for use by the guest workload/guest VM, as described above with reference to FIGS. 4, 5, and 6A. The VMM may also assign a virtual machine identifier (VM_ID) to the guest workload/guest VM.

From "VMM Allocates Hardware Physical Addresses (HPAs) (Pages) to New VM" block 816, control then proceeds to "VMM Launches New VM and Provides Information for the HPAs (Pages) Allocated" block 822, where the host workload manager/VMM launches the new guest workload/guest VM and provides information for the HPAs (pages) allocated to the new guest workload/guest VM. For example, the host workload manager/VMM may provide memory position-dependent address information to the guest workload/guest VM. This memory position-dependent address information may include hardware physical addresses of pages in memory (such as pages into which the consumer image is to be loaded), interrupt descriptor table register information, and other hardware physical addresses for the server(s) that are servicing the consumer's request. These hardware physical addresses are referred to herein as memory position-dependent address information because specific types of data (e.g., page tables) must be loaded into the correct VMM-designated hardware physical addresses on the server for the consumer agent/VM to execute properly. The VMM may also provide the virtual machine identifier VM_ID to the guest workload/guest VM. Control proceeds from "VMM Launches New VM and Provides Information for the HPAs (Pages) Allocated" block 822 to "New VM Initializes VMCS and Determines Expected HPAs" block 824.

At "New VM Initializes VMCS and Determines Expected HPAs" block 824, the new guest workload/guest VM initializes control structures that determine how the guest workload is to execute. For example, for a guest VM, a Virtual Machine Control Structure (VMCS) is initialized to specify hardware physical addresses to be used during execution of the guest workload/guest VM. These hardware physical addresses may include hardware physical addresses of pages in memory (such as pages into which the consumer image is to be loaded), and hardware physical addresses for the guest VM's page tables. From the hardware physical addresses initialized in the VMCS, the guest VM can also determine expected hardware physical address values that should be included in the VMCS during future execution cycles. For example, a VMCS contains a number of host physical addresses, such as the location of the extended page table root (the EPTP or extended page table pointer). The VMCS may also contain hardware physical addresses for data structures such as a MSR exit table, VM Info table, page modification log, etc., that are not translated through page tables. As these VMCS addresses are not translated through page tables, these VMCS addresses are configured with the correct hardware physical memory addresses. Some embodiments may allow the VMM to modify selected fields of the VMCS (such as the EPTP, or host state area) by selectively allowing the VMM to perform VMWrite operations to selected fields that will not compromise the security or alter the behavior of the VM. From "New VM Initializes VMCS and Determines Expected HPAs" block 824, control proceeds to "New VM Sets Up VM Page Table with VA→GPA Mappings" block 826.

At "New VM Sets Up VM Page Table with VA→GPA Mappings" block 826, the newly-established guest workload/VM sets up a VM page table with virtual address (VA) to guest physical address (GPA) mappings. The guest physical addresses (GPAs) are mapped to host physical addresses (HPAs) by the VMM using extended page tables (EPTs). At "New VM Sets Up VM Page Table with VA→GPA Mappings" block 826, the guest workload/guest VM assigns virtual/linear addresses to the guest physical addresses (GPAs) selected by the guest VM. The host VMM uses EPTs to translate the guest's GPAs to the host's HPAs. From "New VM Sets Up VM Page Table with VA→GPA Mappings" block 826, control then proceeds to "New VM Saves MOT Entry as GPA→Expected HPA" block 830.

At "New VM Saves MOT Entry as GPA→Expected HPA" block 830, the new VM specifies a mapping between the GPA and an expected HPA as a memory ownership table entry. The memory ownership table entry can then be used by the guest workload/guest VM to confirm that addresses provided later by the host workload manager/VMM are consistent with the originally-provided mappings to the encrypted image content and have not been compromised. From "New VM Saves MOT Entry as GPA→Expected HPA" block 830, control then proceeds to "New VM Encrypts MOT Entry with Key Domain Key and Provides MOT Entry to VMM" block 832.

At "New VM Encrypts MOT Entry with Key Domain Key and Provides MOT Entry to VMM" block 832, the new guest workload/guest VM encrypts the memory ownership table (MOT) entry with the key domain key used to encrypt memory assigned to the new guest workload/guest VM. When encrypting the MOT entry, the VM may also use the hardware physical address of the entry in the MOT table as a tweak to the encryption cipher. This encryption protocol maintains consistency with using XTS memory encryption when a hardware physical memory address is used as a tweak, as the MOT table itself is also stored in memory. By encrypting the MOT entries with the key domain key, the guest workload/guest VM ensures that the host workload manager/VMM cannot read, modify or forge the MOT entries. From "New VM Encrypts MOT Entry with Key Domain Key" block 832, control then proceeds to "VMM Writes Encrypted MOT Entry to Memory Ownership Table" block 834.

At "VMM Writes Encrypted MOT Entry to Memory Ownership Table" block 834, the host workload manager/VMM writes the encrypted MOT entry provided by the guest workload/guest VM to the memory ownership table at a location in the table corresponding to the expected hardware physical address of the MOT entry. In one embodiment, the guest workload/guest VM identifier (VM_ID) is also captured in the memory ownership table.

Figure 9:
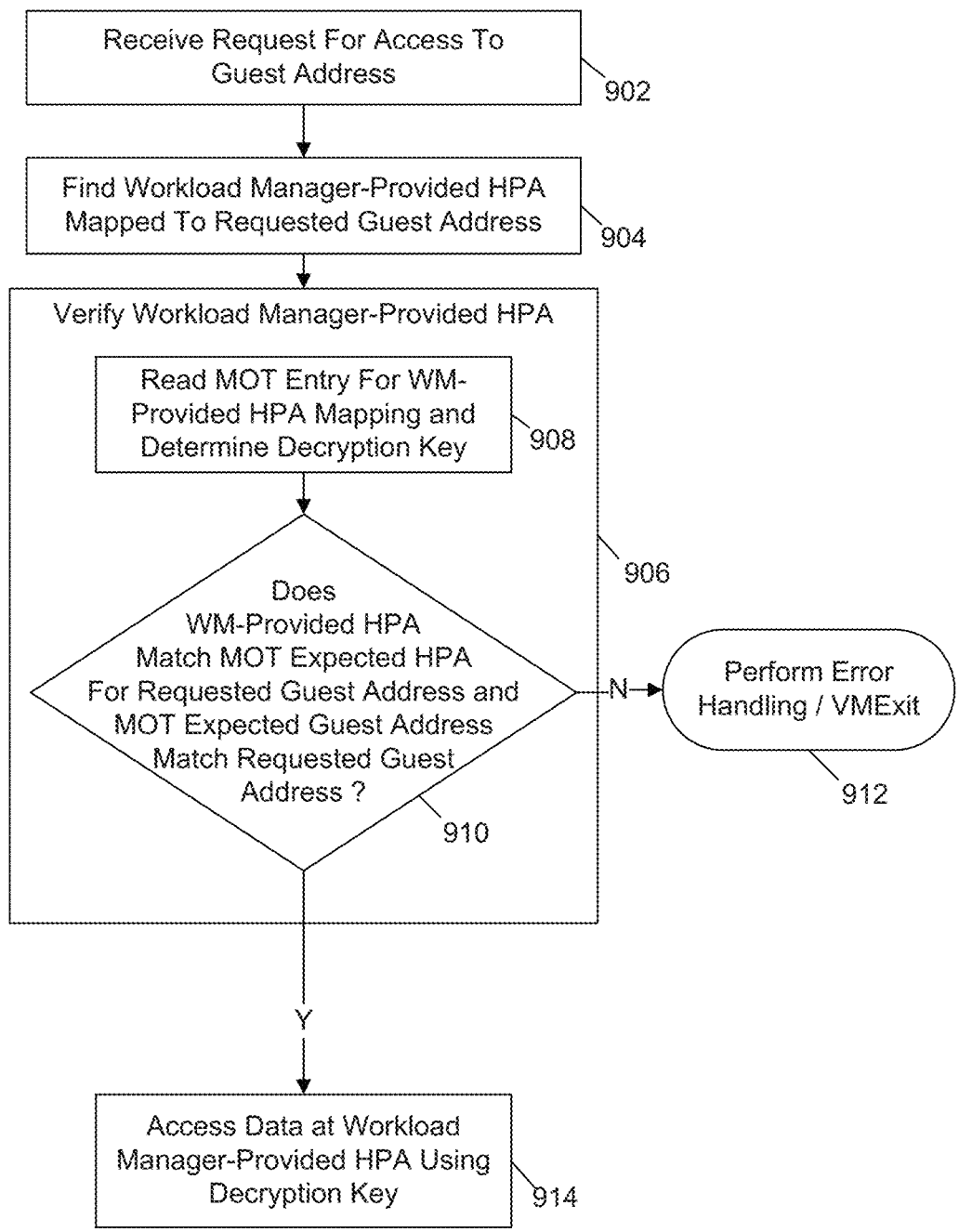
FIG. 9 is a flowchart of a method performed in accordance with embodiments.

Referring to FIG. 9, a flowchart illustrates a method 900 to access data in memory in response to a request from a guest workload. In "Receive Request for Access to Guest Address" block 902, a processor receives a request from a guest workload/guest VM to access data at a guest address provided by the guest VM. The requested guest address may be a guest virtual/linear address or a guest physical address, and the processor will search for an actual hardware physical address corresponding to the requested guest address. The term "workload manager-provided hardware physical address" is used herein to refer to the lowest-level translation of a guest address to the actual hardware physical address. In a virtualized environment, the lowest-level translation of a guest address to an actual hardware physical address may be provided using an Extended Page Table managed by the VMM. In a non-virtualized environment, the lowest-level translation of a guest address to an actual hardware physical address may be provided using a page table managed by the operating system.

From "Receive Request for Access to Guest Address" block 902, control then proceeds to "Find Workload Manager-Provided HPA Mapped to Requested Guest Address" block 904. In one embodiment, the HPA is found by the processor in the page tables for the host workload manager/VMM or by a page miss hander of the processor in the extended page tables for the host workload manager/VMM. In one embodiment, the processor (page miss handler/PMH) "walks" the page tables to translate the requested guest address to a hardware physical address (HPA) so that the memory access (load/store/execute) may complete. The processor/PMH looks up the requested guest address in the page tables/EPTs to find a "workload manager-provided hardware physical address (HPA)" that is mapped to the requested guest address. The term "workload manager-provided hardware physical address" is used to indicate that the hardware physical address is provided by the host workload manager or VMM and is therefore untrusted by the guest workload/guest VM. If a compromised VMM were to attempt to modify the control flow of the guest workload/guest VM, the compromised VMM may modify the hardware physical address provided to the guest workload/guest VM for the requested guest address. For this reason, the workload manager-provided hardware physical address is verified in the next step, In one embodiment, after finding the workload manager-provided hardware physical address, the guest workload may store the memory mapping from the requested guest address to the workload manager-provided HPA in the Memory Ownership Table. Furthermore, in order to preserve the memory mapping for future use, the requested guest address may be stored as an expected guest address for the workload manager-provided HPA. Storing an expected guest address enables the processor to compare the requested guest address with the expected guest address in the MOT for the guest workload/guest VM requesting access. From "Find Workload Manager-Provided HPA Mapped to Requested Guest Address" block 904, control then proceeds to "Verify Workload Manager-Provided HPA" block 906.

At "Verify Workload Manager-Provided HPA" block 906, the hardware physical address found for the requested guest address is verified. In one embodiment, the HPA is verified using the memory ownership table described above. At "Read MOT Entry for WM-Provided HPA Mapping and Determine Decryption Key" block 908, the encrypted MOT entry corresponding to the translated workload manager-provided HPA found in the pages tables is decrypted. For example, the MOT is a table in memory and the MOT entries are indexed based on the HPA of the page being accessed (e.g. page HPA 0 is index 0 in the MOT table, or the first entry, and page HPA 1 is index 1 in the MOT table, the second entry, and so on).

In one embodiment, the decryption key is determined using a key domain identifier (KD_ID) that is stored in the uppermost physical bits of the HPA; once the key domain identifier (KD_ID) is known, the key domain key can be identified and provided to a memory encryption engine that can decrypt the data stored in the memory ownership table (MOT). The memory encryption engine may also use the hardware physical address of the MOT entry as a tweak. If the MOT entry is not loaded into the correct workload manager-provided hardware physical address, the MOT entry will not decrypt properly. Such embodiments may not require the expected hardware physical address to be stored redundantly in the MOT entry corresponding to that HPA.

From "Read MOT Entry for WM-Provided HPA Mapping and Determine Decryption Key" block 908, control then proceeds to "Does WM-Provided HPA Match MOT Expected HPA for Requested Guest Address and MOT Expected Guest Address Match Requested Guest Address?" decision point 910. If the translated workload manager-provided HPA does not match the MOT entry's expected HPA field (1004 of FIG. 10) and/or the requested guest address does not match the MOT entry's expected guest address field (1006 of FIG. 10), control proceeds to "Perform Error Handling/VMExit" block 912. At "Perform Error Handling/VMExit" block 912, error handling may be performed and the guest workload/guest VM may be caused to exit.

At "Does WM-Provided HPA Match MOT Expected HPA for Requested Guest Address and MOT Expected Guest Address Match Requested Guest Address?" decision point

910, the workload manager-provided HPA and the guest address found in the processor/PMH walk of the page tables need to match the expected HPA and expected guest address in the decrypted MOT entry. If the workload manager-provided HPA matches the MOT expected HPA (1004 of FIG. 10) and the MOT entry expected guest address field (1006 of FIG. 10) matches the actual translated guest address found during the page walk, control proceeds to "Access Data at Found HPA Using Decryption Key" block 914.

At "Access Data at Workload Manager-Provided HPA Using Decryption Key" block 914, the data requested by the guest VM is accessed. The decryption key is the key domain key identified at block 908.

Referring to FIG. 10, an example of a memory ownership table 1000 is shown. Column 1002 contains the row index and is shown in dotted lines because the row index is used here for illustrative purposes only; the row index is not stored as part of the memory ownership table. In one embodiment, such as the embodiment described in FIGS. 6A and 6B, an original workload manager-provided hardware physical address allocated to the guest VM is used as an index to the table. The allocation of hardware physical addresses to the guest VM was described previously with reference to FIGS. 4 and 5. While this embodiment uses a memory ownership table indexed by a hardware physical address/HPA, other embodiments may use any form of searchable structure such as a list, tree, hash table, graph, etc. to find the guest address given the translated hardware physical address.

Column 1004 contains an expected host physical address and column 1006 contains an expected guest address. These columns are used by the guest workload/guest VM to preserve the original mappings provided by the host workload manager when the guest workload/guest VM is initially created, as described with reference to FIGS. 6A and 8.

Column 1008 contains a state of a page stored at the guest address; and column 1010 contains data values of "0000." Column 1010 may be used as a quality assurance mechanism to ensure that the proper key has been used to decrypt an MOT entry. If the incorrect decryption key is used to decrypt column 1010, the resulting data will have values other than "0000," as using the wrong key will cause fields 1004, 1006, 1008, and 1010 of the MOT entry to decrypt to random (corrupt) values, unlikely to be the specific value of 0000, thus indicating an error.

With regard to column 1008, the state field is shown with values of "Large," "Active," "Shared," and "Inval." The "Shared" value indicates that the consumer/guest VM intended the page to be shared. When the processor interprets such a "shared" MOT entry, the processor will use the VMM's KD_ID in the physical memory addresses for that page (or otherwise indicate no key) so that the memory contents of the associated memory page will not be encrypted (or will be encrypted with a common key shared by the VMM and a particular guest VM). A VM's memory page can be selectively shared with/exposed to the VMM allowing communication between the guest VM and host VMM.

The state field in column 1008 may contain a "Large" value or a "Huge" value. A normal (base) page size is 4 KB. Intel® processors support large pages of 4 MB, and huge pages of 4 GB. The memory ownership table indicates the expected page size to assure that the page size (as determined from the page table walk) is as expected, so the VMM cannot misrepresent the page size.

Note that the shaded rows are encrypted and decrypted using key K1 and correspond to one guest workload/guest virtual machine. The unshaded rows are encrypted and decrypted using key K2 and correspond to another guest workload/guest virtual machine. The entire MOT table may have any number of entries belonging to any number of separate key domains/VMs, with each MOT entry encrypted with the corresponding key domain keys.

Column 1012 is shown in dotted lines because the memory encryption key/key domain key for the MOT entry is not required to be stored as part of the memory ownership table. The key domain key for the MOT entry is identified and used to encrypt and decrypt entries in the MOT table 1000. In one embodiment, the key domain identifier is present in the uppermost physical address bits of the hardware physical address used by the processor to access a MOT entry, and the key domain identifier can be used to determine the key domain key to be used to encrypt (on a memory write) or decrypt (on a memory read) the MOT entry.

In this example, for the memory ownership table 1000 of FIG. 10, a VMM provides an extended page table that maps a respective one of expected HPAs 0, 2, 4, 6 to a guest address 7, 5, 3, 1 and a respective one of expected HPAs 1, 3, 5, 7 to a guest address 9, 11, 13, 15. The processor can use memory ownership table 1000 to determine that the translated workload manager-provided HPA does not match the expected HPA and that the VMM may be compromised. For example, if the VMM provides a page table that maps a respective one of HPAs 1, 3, 5, 7 to a guest address other than 9, 11, 13, 15, the processor can also use memory ownership table 1000 to determine that the translated workload manager-provided HPA does not match the expected HPA and that the VMM may be compromised.

In some embodiments, the memory ownership table may contain a field indicating whether or not a physical memory page contains a VMCS. In this way, the consumer/VM can use the MOT entries to identify the portions of the consumer's/VM's encrypted image that contain VMCS structures. A VMCS field can be used to prevent a malicious VMM from attempting to inject a spurious VMCS into the VM (e.g., through a communications channel) and attempting to load the spurious VMCS as the VM's authorized VMCS. When the processor executes the VMPTRLD instruction, the processor may access the MOT table for the physical address HPA specified in the EAX register for VMPTRLD. For example, assuming the HPA of the VMCS matches the expected HPA of the MOT entry, if the MOT entry for the VMPTRLD HPA has the VMCS field set TRUE (a Boolean field), then the processor will proceed in loading the VMCS. If the VMCS field is FALSE, the processor will exit and report an error to the VMM. The processor uses the KD_ID specified as part of the address used in the VMPTRLD when accessing the MOT entry so that the key corresponding to the specified KD_ID will be used by the memory encryption engine to decrypt the corresponding MOT entry.

Another additional field that may be contained in the MOT entries is the guest VM's virtual/linear address (VA, not shown in FIG. 10). As the processor PMH may use the VA to look up a guest physical address and the guest physical address to look up the workload manager-provided HPA by walking the page tables, the MOT entry may also require that the VA matches the VA found in the MOT entry. The VA field may be used to prevent replay of memory contents after a VM workload reassigns its GPAs to different VAs.

Similarly, the expected CR3 processor register value (not shown) may be a field in the MOT. The CR3 processor register enables the processor to translate virtual/linear addresses into hardware physical addresses by locating the page directory and page tables for the current task/workload. Typically, the upper 20 bits of CR3 become the page directory base register (PDBR), which stores the hardware physical address of the first page directory entry. Storing an expected CR3 processor register value in the MOT enables the processor/PMH to check that the value of the actual CR3 page directory base register matches the expected CR3 value stored in the corresponding MOT entry. The VA and expected CR3 fields of the MOT described in this paragraph and the previous paragraph may also contain a value of "ANY," indicating that any value of CR3 or VA is acceptable. This method can be used by the guest workload to prevent replay of memory mappings belonging to previous tasks/processes, as new MOT entries are created for new tasks/processes.

Other fields may verify that permissions in the EPT structures and/or memory types in the EPT structure match the expected permissions and memory types in the MOT entries, as expected by the consumer/VM. Any other processor state/information that a guest workload requires the processor to compare and verify with the guest workload expected values may be included as additional fields in the MOT entries.

EXAMPLES

The following examples pertain to further embodiments.

In Example 1, an apparatus to secure a guest workload in a public cloud service provider environment includes a processor; and a memory coupled to the processor; where the processor is to execute an untrusted workload manager to manage execution of at least one guest workload; the untrusted workload manager is to (i) allocate a region of the memory for a guest workload of the at least one guest workload, and (ii) assign a respective original hardware physical address associated with a respective memory location of the region of the memory to a respective original guest address provided by the guest workload; the guest workload is to store a respective mapping from each respective original guest address for the region of memory allocated to the guest workload to the respective original hardware physical address for the guest workload. In response to receiving a request from the guest workload to access the memory using a requested guest address, the processor is further to: (i) obtain, from the untrusted workload manager, a translated workload manager-provided hardware physical address to correspond to the requested guest address; (ii) determine whether a stored mapping exists for the translated workload manager-provided hardware physical address; (iii) in response to finding the stored mapping, determine whether a stored expected guest address from the stored mapping matches the requested guest address; and (iv) if the stored expected guest address from the stored mapping matches the requested guest address, enable the guest workload to access contents of the translated workload-manager provided hardware physical address.

In Example 2, the processor of Example 1 is further to: determine whether a stored expected hardware physical address from the stored mapping matches the translated workload manager-provided hardware physical address, where enabling the guest workload to access contents of the translated workload-manager provided hardware physical address includes enabling the guest workload if the stored expected guest address from the stored mapping matches the requested guest address and the stored expected hardware physical address from the stored mapping matches the translated workload manager-provided hardware physical address.

In Example 3, the guest workload of Examples 1 and 2 is further to: (i) cause contents written by the guest workload into each respective memory location of the region of the memory to be encrypted with a consumer-provided key for the guest workload; and (ii) cause each respective mapping for the guest workload to be encrypted with the consumer-provided key.

In Example 4, the guest workload of Examples 1-3 causing a mapping for the guest workload to be encrypted with the consumer-provided key binds the respective original guest address of the mapping to the respective original hardware physical address of the mapping.

In Example 5, the guest workload of Examples 1-3 causing the contents written by the guest workload to be encrypted with the consumer-provided key further binds the respective original guest address of the mapping to encrypted contents of the respective original hardware physical address of the mapping.

In Example 6, the guest workload of Examples 1-5 is further to store each respective mapping as a respective entry in a memory ownership table.

In Example 7, the guest workload of Examples 1-6 is further to store a virtual mapping from a respective original guest address for the guest workload to a respective original virtual address for the guest workload in the memory ownership table; and the processor of Examples 1-6, in response to a request from the guest workload to access data stored at the respective original guest address, is further to: (i) identify an entry in the memory ownership table corresponding to the respective original guest address; and (ii) verify that an expected original virtual address from the entry in the memory ownership table matches the respective original virtual address prior to accessing data stored at the respective original guest address.

In Example 8, the guest workload of Examples 1-7 is further to store an expected register value for the guest workload to enable the processor to locate a page directory and a page table for the guest workload; and the processor of Examples 1-7 is to verify that a workload manager-provided register value matches the expected register value for the guest workload prior to accessing the page directory and the page table for the guest workload.

In Example 9, the guest workload of Examples 1-8 is further to: (i) store a control structure mapping from an original control structure hardware physical address to an expected control structure hardware physical address for the guest workload; and (ii) store a control structure indicator with the control structure mapping, where the control structure indicator is set to TRUE if contents of the original control structure hardware physical address contain a control structure for the guest workload; and the processor of Examples 1-8 is further to verify that a workload manager-provided control structure hardware physical address for the guest workload matches the expected control structure hardware physical address for the guest workload and that the control structure indicator is TRUE prior to loading the control structure for the guest workload from the workload manager-provided control structure hardware physical address.

In Example 10, the guest workload of Examples 1-9 is further to store an expected content verification value for a particular original hardware physical address, where the expected content verification value is determined by hashing contents of the particular original hardware physical address; and the processor of Examples 1-9 is to verify that the expected content verification value matches a hash of contents of the particular original hardware physical address prior to accessing data stored at the particular original hardware physical address.

Example 10 is a computer-implemented method to secure a guest workload in a public cloud service provider environment, where the method is performed by a processor and the method includes: executing an untrusted workload manager to manage execution of at least one guest workload; receiving a request from a guest workload of the at least one guest workload to access a memory using a requested guest address; obtaining, from the untrusted workload manager, a translated workload manager-provided hardware physical address to correspond to the requested guest address; determining whether a stored mapping exists for the translated workload manager-provided hardware physical address; in response to finding the stored mapping, determining whether a stored expected guest address from the stored mapping matches the requested guest address; and, if the stored expected guest address from the stored mapping matches the requested guest address, enabling the guest workload to access contents of the translated workload-manager provided hardware physical address.

In Example 12, the computer-implemented method of claim 11 further includes determining whether a stored expected hardware physical address from the stored mapping matches the translated workload manager-provided hardware physical address, where enabling the guest workload to access contents of the translated workload-manager provided hardware physical address includes enabling the guest workload if the stored expected guest address from the stored mapping matches the requested guest address and the stored expected hardware physical address from the stored mapping matches the translated workload manager-provided hardware physical address.

In Example 13, the computer-implemented method of Examples 11-12 further includes identifying an entry in a memory ownership table including a virtual mapping from a respective original guest address for the guest workload to a respective original virtual address for the guest workload; verifying that an expected original guest virtual address from the entry in the memory ownership table matches the respective original virtual address from the entry prior to accessing data stored at the respective original guest address.

In Example 14, the computer-implemented method of Examples 11-13 further includes identifying a stored expected register value for the guest workload to locate a page directory and a page table for the guest workload; and verifying that a workload manager-provided register value matches the stored expected register value for the guest workload prior to accessing the page directory and the page table for the guest workload.

In Example 15, the computer-implemented method of Examples 11-14 further includes identifying (i) a stored control structure mapping from an original control structure hardware physical address to an expected control structure hardware physical address for the guest workload and (ii) a stored control structure indicator associated with the control structure mapping, where the control structure indicator is set to TRUE if contents of the original control structure hardware physical address contain a control structure for the guest workload; and verifying that a workload manager-provided control structure hardware physical address for the guest workload matches the expected control structure hardware physical address for the guest workload and that the control structure indicator is TRUE prior to loading the control structure for the guest workload from the workload manager-provided control structure hardware physical address.

In Example 16, the computer-implemented method of Examples 11-15 further includes identifying an expected content verification value for a particular original hardware physical address; verifying that the expected content verification value matches a hash of contents of the particular original hardware physical address prior to accessing data stored at the particular original hardware physical address.

In Example 17, at least one computer-readable medium includes instructions, that when executed by a processor, cause a machine to perform the methods of Examples 11-16.

In Example 18, an apparatus to secure a guest workload in a public cloud service provider environment includes means for executing an untrusted workload manager to manage execution of at least one guest workload; means for receiving a request from a guest workload of the at least one guest workload to access a memory using a requested guest address; means for obtaining, from the untrusted workload manager, a translated workload manager-provided hardware physical address to correspond to the requested guest address; means for determining whether a stored mapping exists for the translated workload manager-provided hardware physical address; means for determining whether a stored expected guest address from the stored mapping matches the requested guest address in response to finding the stored mapping; and means for enabling the guest workload to access contents of the translated workload-manager provided hardware physical address if the stored expected guest address from the stored mapping matches the requested guest address.

In Example 19, the apparatus of Example 18 further includes: means for determining whether a stored expected hardware physical address from the stored mapping matches the translated workload manager-provided hardware physical address, where the means for enabling the guest workload to access contents of the translated workload-manager provided hardware physical address includes means for enabling the guest workload if the stored expected guest address from the stored mapping matches the requested guest address and the stored expected hardware physical address from the stored mapping matches the translated workload manager-provided hardware physical address.

In Example 20, the apparatus of Examples 18-19 further includes means for identifying an entry in a memory ownership table including a virtual mapping from a respective original guest address for the guest workload to a respective original virtual address for the guest workload; and means for verifying that an expected original guest virtual address from the entry in the memory ownership table matches the respective original virtual address from the entry prior to accessing data stored at the respective original guest address.

In Example 21, the apparatus of Examples 18-20 further includes means for identifying a stored expected register value for the guest workload to locate a page directory and a page table for the guest workload; and means for verifying that a workload manager-provided register value matches the stored expected register value for the guest workload prior to accessing the page directory and the page table for the guest workload.

In Example 22, the apparatus of Examples 18-21 further includes means for identifying a stored control structure mapping from an original control structure hardware physical address to an expected control structure hardware physical address for the guest workload; means for identifying a stored control structure indicator associated with the control structure mapping, where the control structure indicator is set to TRUE if contents of the original control structure hardware physical address contain a control structure for the guest workload; and means for verifying that a workload manager-provided control structure hardware physical address for the guest workload matches the expected control structure hardware physical address for the guest workload and that the control structure indicator is TRUE prior to loading the control structure for the guest workload from the workload manager-provided control structure hardware physical address.

In Example 23, the apparatus of Examples 18-22 further includes means for identifying an expected content verification value for a particular original hardware physical address; and means for verifying that the expected content verification value matches a hash of contents of the particular original hardware physical address prior to accessing data stored at the particular original hardware physical address.

In Example 24, at least one computer-readable medium includes instructions, that when executed by a processor, cause a machine to perform the methods of Examples 11-16.

In Example 25, a computer-implemented method to secure a guest workload in a public cloud service provider environment is performed by a processor and includes: executing, by a processor, a guest workload of a plurality of guest workloads managed by an untrusted workload manager; receiving, by the guest workload, from the untrusted workload manager an allocation of a region of a memory; providing, by the guest workload, a respective original guest address for a respective memory location of the region of the memory; receiving, by the guest workload, a respective original hardware physical address assigned to the respective original guest address; storing, by the guest workload, a respective mapping from the respective original guest address to the respective original hardware physical address.

In Example 26, the computer-implemented method of Example 25 further includes: causing, by the guest workload, contents written by the guest workload into each respective memory location of the region of the memory to be encrypted with a consumer-provided key for the guest workload; and causing, by the guest workload, each respective mapping for the guest workload to be encrypted with the consumer-provided key.

In Example 27, in the computer-implemented method of Examples 25-26, causing a mapping for the guest workload to be encrypted with the consumer-provided key binds the respective original guest address of the mapping to the respective original hardware physical address of the mapping.

In Example 28, in the computer-implemented method of Examples 25-27, causing the contents written by the guest workload to be encrypted with the consumer-provided key further binds the respective original guest address of the mapping to encrypted contents of the respective original hardware physical address of the mapping.

In Example 29, the computer-implemented method of Examples 25-28, further includes storing, by the guest workload, each respective mapping as a respective entry in a memory ownership table.

In Example 30, the computer-implemented method of Examples 25-29 further includes storing, by the guest workload, a virtual mapping from a respective original guest address for the guest workload to a respective original virtual address for the guest workload in the memory ownership table; identifying, by the processor, an entry in the memory ownership table corresponding to the respective original guest address in response to a request from the guest workload to access data stored at the respective original guest address; and verifying, by the processor, that an expected original virtual address from the entry in the memory ownership table matches the respective original virtual address prior to accessing data stored at the respective original guest address.

In Example 31, the computer-implemented method of Examples 25-30 further includes storing, by the guest workload, an expected register value for the guest workload to enable the processor to locate a page directory and a page table for the guest workload; and verifying, by the processor, that a workload manager-provided register value matches the expected register value for the guest workload prior to accessing the page directory and the page table for the guest workload.

In Example 32, the computer-implemented method of Examples 25-31 further includes storing, by the guest workload, a control structure mapping from an original control structure hardware physical address to an expected control structure hardware physical address for the guest workload; storing, by the guest workload, a control structure indicator with the control structure mapping, where the control structure indicator is set to TRUE if contents of the original control structure hardware physical address contain a control structure for the guest workload; and verifying, by the processor, that a workload manager-provided control structure hardware physical address for the guest workload matches the expected control structure hardware physical address for the guest workload and that the control structure indicator is TRUE prior to loading the control structure for the guest workload from the workload manager-provided control structure hardware physical address.

In Example 33, the computer-implemented method of Examples 25-32 further includes storing, by the guest workload, an expected content verification value for a particular original hardware physical address, where the expected content verification value is determined by hashing contents of the particular original hardware physical address; and verifying, by the processor, that the expected content verification value matches a hash of contents of the particular original hardware physical address prior to accessing data stored at the particular original hardware physical address.

Note that the processor of Examples 1-33 may be implemented using various means.

In Example 34 the processor of Examples 1-33 is implemented as a virtual processor.

In Example 35, the processor of Examples 1-33 comprises a system on a chip (SoC) incorporated in a user equipment touch-enabled device.

In Example 36, the processor of Examples 1-33, a system comprises a display and a memory, and includes the processor of one or more of the above Examples.

In Example 37, a computer-readable medium including data is to be used by at least one machine to fabricate at least one integrated circuit to perform the method of any one of the above Examples.

In Example 38, an apparatus comprises means for performing the method of any one of the above Examples.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer-readable medium comprising instructions that, when executed, enable a processor to:
   execute a guest workload managed by an untrusted workload manager, the guest workload to create memory ownership entries for a memory ownership structure for the guest workload, the memory ownership entries to map original guest addresses to respective original hardware physical addresses;
   receive a request from the guest workload managed by the untrusted workload manager to access memory using a requested guest address;
   after receiving the request from the guest workload managed by the untrusted workload manager to access memory using the requested guest address, obtain a translated hardware physical address to correspond to the requested guest address;
   determine whether the memory ownership structure for the guest workload contains a memory ownership entry for the translated hardware physical address;
   if the memory ownership structure for the guest workload contains the memory ownership entry for the translated hardware physical address, determine whether a stored expected guest address from the memory ownership entry matches the requested guest address;
   if the stored expected guest address from the memory ownership entry matches the requested guest address, enable the guest workload to access contents of the translated hardware physical address; and
   if the stored expected guest address from the memory ownership entry does not match the requested guest address, abort the request from the guest workload to access memory.

2. The at least one computer-readable medium of claim 1, wherein the instructions, when executed, further enable the processor to:
   determine whether a stored expected hardware physical address from the memory ownership entry for the translated hardware physical address matches the translated hardware physical address; and
   wherein enabling the guest workload to access contents of the translated hardware physical address comprises enabling the guest workload if (a) the stored expected guest address from the memory ownership entry matches the requested guest address and (b) the stored expected hardware physical address from the memory ownership entry matches the translated hardware physical address.

3. The at least one computer-readable medium of claim 1, wherein the memory ownership entries map original guest physical addresses to respective original hardware physical addresses.

4. The at least one computer-readable medium of claim 1, wherein the instructions further enable the processor to:
   identify a stored expected register value for the guest workload to enable the processor to locate a page directory and a page table for the guest workload; and
   verify that a workload manager-provided register value matches the stored expected register value for the guest workload prior to accessing the page directory and the page table for the guest workload.

5. The at least one computer-readable medium of claim 1, wherein the instructions further enable the processor to:
   in response to receiving, from the workload manager, a hardware physical address for a control structure for the guest workload, determine whether a control structure indicator in a memory ownership entry for said hardware physical address in the memory ownership table for the guest workload is TRUE prior to loading the control structure for the guest workload from said hardware physical address.

6. The at least one computer-readable medium of claim 1, wherein the instructions further enable the processor to:
   identify an expected content verification value for a particular original hardware physical address; and
   verify that the expected content verification value matches a hash of contents of the particular original hardware physical address prior to accessing data stored at the particular original hardware physical address.

7. At least one non-transitory computer-readable medium comprising instructions that, when executed, enable a processor to:
   execute a guest workload managed by an untrusted workload manager, wherein the guest workload is to:
   (i) receive, from the untrusted workload manager, an allocation of a region of a memory,
   (ii) provide an original guest address for a memory location of the region of the memory, (iii) receive an original hardware physical address assigned to the original guest address, and (iv) create a memory ownership entry for a memory ownership structure for the guest workload, the memory ownership entry to map the original hardware physical address to the original guest address;

in response to receiving a request from the guest workload to access memory using a requested guest address, obtain a translated hardware physical address to correspond to the requested guest address;

determine whether the memory ownership structure for the guest workload contains a memory ownership entry for the translated hardware physical address which contains a stored expected guest address that matches the requested guest address; and if the memory ownership structure for the guest workload does not contain a memory ownership entry for the translated hardware physical address which contains the stored expected guest address that matches the requested guest address, abort the request from the guest workload to access memory.

8. The at least one computer-readable medium of claim 7, wherein the guest workload is further to:

cause contents written by the guest workload into the region of the memory to be encrypted with a consumer-provided key for the guest workload; and cause each memory ownership entry for the guest workload to be encrypted with the consumer-provided key.

9. The at least one computer-readable medium of claim 8, wherein:

causing the memory ownership entry for the guest workload to be encrypted with the consumer-provided key binds the original guest address of the memory ownership entry to the original hardware physical address of the memory ownership entry.

10. The at least one computer-readable medium of claim 8, wherein:

causing the contents written by the guest workload to be encrypted with the consumer-provided key further binds the original guest address of the memory ownership entry to encrypted contents of the original hardware physical address of the memory ownership entry.

11. The at least one computer-readable medium of claim 7, wherein:

the guest workload is further to provide the memory ownership entry to the untrusted workload manager, to be stored in the memory ownership structure for the guest workload.

12. The at least one computer-readable medium of claim 7, wherein the memory ownership entry maps the original hardware physical address to an original guest physical address.

13. The at least one computer-readable medium of claim 7, wherein:

the guest workload is further to store an expected register value for the guest workload to enable the processor to locate a page directory and a page table for the guest workload; and the processor is to verify that a workload manager-provided register value matches the expected register value for the guest workload prior to accessing the page directory and the page table for the guest workload.

14. The at least one computer-readable medium of claim 7, wherein the instructions further enable the processor to:

in response to receiving, from the workload manager, a hardware physical address for a control structure for the guest workload, determine whether a control structure indicator in a memory ownership entry for said hardware physical address in the memory ownership table for the guest workload is TRUE prior to loading the control structure for the guest workload from said hardware physical address.

15. The at least one computer-readable medium of claim 7, wherein:

the guest workload is further to store an expected content verification value for a particular original hardware physical address, wherein the expected content verification value is determined by hashing contents of the particular original hardware physical address; and the processor is to verify that the expected content verification value matches a hash of contents of the particular original hardware physical address prior to accessing data stored at the particular original hardware physical address.

16. An apparatus comprising:

a memory;

a processor coupled to the memory; and a computer-readable medium coupled to the processor, the computer-readable medium comprising instructions that, when executed, enable the processor to perform operations comprising:

executing a guest workload managed by an untrusted workload manager, the guest workload to create memory ownership entries for a memory ownership structure for the guest workload, the memory ownership entries to map original guest addresses to respective original hardware physical addresses;

receiving a request from the guest workload to access the memory using a requested guest address;

after receiving the request from the guest workload to access the memory using the requested guest address, obtaining a translated hardware physical address to correspond to the requested guest address;

determining whether the memory ownership structure for the guest workload contains a memory ownership entry for the translated hardware physical address;

if the memory ownership structure for the guest workload contains the memory ownership entry for the translated hardware physical address, determining whether a stored expected guest address from the memory ownership entry matches the requested guest address;

if the stored expected guest address from the memory ownership entry matches the requested guest address, enabling the guest workload to access contents of the translated hardware physical address; and if the stored expected guest address from the memory ownership entry does not match the requested guest address, aborting the request from the guest workload to access the memory.

17. The apparatus of claim 16, wherein the instructions enable the processor to perform further operations comprising:

determining whether a stored expected hardware physical address from the memory ownership entry for the translated hardware physical address matches the translated hardware physical address; and wherein enabling the guest workload to access contents of the translated hardware physical address comprises enabling the guest workload if (a) the stored expected guest address from the memory ownership entry matches the requested guest address and (b) the stored expected hardware physical address from the memory ownership entry matches the translated hardware physical address.

18. The apparatus of claim 16 wherein the memory ownership entries map original guest physical addresses to respective original hardware physical addresses.

19. The apparatus of claim 16, wherein the instructions enable the processor to perform further operations comprising:
   identifying a stored expected register value for the guest workload to locate a page directory and a page table for the guest workload; and
   verifying that a workload manager-provided register value matches the stored expected register value for the guest workload prior to accessing the page directory and the page table for the guest workload.

20. The apparatus of claim 16, wherein the instructions enable the processor to perform further operations comprising:
   in response to receiving, from the workload manager, a hardware physical address for a control structure for the guest workload, determine whether a control structure indicator in a memory ownership entry for said hardware physical address in the memory ownership table for the guest workload is TRUE prior to loading the control structure for the guest workload from said hardware physical address.

21. The apparatus of claim 16, wherein the instructions enable the processor to perform further operations comprising:
   identifying an expected content verification value for a particular original hardware physical address; and
   verifying that the expected content verification value matches a hash of contents of the particular original hardware physical address prior to accessing data stored at the particular original hardware physical address.

* * * * *